United States Patent [19]
Carey et al.

[11] Patent Number: 5,146,561
[45] Date of Patent: Sep. 8, 1992

[54] COMMUNICATION NETWORK DATA MANAGER SYSTEM

[75] Inventors: Paul J. Carey, Arlington Heights; Thomas R. Imburgia, Naperville; John L. Edgar, Buffalo Grove; Denis C. McHugh, Palatine; Lan P. Tam, Chicago; Douglas Chieng, Schaumburg; Mark Williamson, Warrenville, all of Ill.

[73] Assignee: Sears Communications Network, Inc., Arlington Heights, Ill.

[21] Appl. No.: 203,874

[22] Filed: Jun. 2, 1988

[51] Int. Cl.⁵ .................. G06F 15/16; G06F 15/40; G06F 13/00
[52] U.S. Cl. ............... 395/200; 364/DIG. 1; 364/228.3; 364/229.1; 364/282.1; 364/284; 364/284.4; 395/600
[58] Field of Search ... 364/200 MS File, 900 MS File; 395/200, 600, 650

[56] References Cited

U.S. PATENT DOCUMENTS

| | | | |
|---|---|---|---|
| 3,641,505 | 2/1972 | Artz et al. | 364/200 |
| 3,916,380 | 10/1975 | Fletcher et al. | 364/200 |
| 4,204,251 | 5/1980 | Brudevold | 364/200 |
| 4,396,923 | 8/1983 | Segarra et al. | 364/200 |
| 4,400,778 | 8/1983 | Vivian et al. | 364/200 |
| 4,504,906 | 3/1985 | Itaya et al. | 364/200 |
| 4,604,686 | 8/1986 | Reiter et al. | 364/200 |
| 4,638,424 | 1/1987 | Beglin et al. | 364/200 |
| 4,686,620 | 8/1987 | Ng | 364/200 |
| 4,692,862 | 9/1987 | Cousin et al. | 364/200 |
| 4,754,395 | 6/1988 | Weisshaar et al. | 364/200 |
| 4,771,375 | 9/1988 | Beglin et al. | 364/200 |
| 4,791,566 | 12/1988 | Sudama et al. | 364/200 |

*Primary Examiner*—Kevin A. Kriess

[57] ABSTRACT

The communication network data manager system according to the invention provides remotely located host processors with the capability of moving sequential datasets, partitioned datasets, or members of partitioned datasets between them. Data is read directly from the source dataset, which may be on a tape or disk, and is written directly to the target dataset which also may be on a tape or disk. No intermediate storage is required for queuing or spooling the data being transferred. A data transfer request may be entered by the user through a user console operating under a menu driven display format. Alternatively, the data set transfer request may be generated by continuously running job applications through a batch interface.

19 Claims, 11 Drawing Sheets

Microfiche Appendix Included
(121 Microfiche, 6818 Pages)

NETWORK OVERVIEW

REMOTE COMMAND PROCESSING

COMMAND MANAGER TASK OPERATION

COMMUNICATION SERVICES TASK OPERATION

COMMUNICATION NETWORK DATA MANAGER SYSTEM

MICROFICHE APPENDIX

The present application includes a microfiche appendix comprising 121 microfiche and 6818 frames.

FIELD OF THE INVENTION

The present invention relates to a communication network data manager system, and more particularly, to a data manager system which provides for ease of communication between host computers.

BACKGROUND OF THE INVENTION

With the advent of widespread use of computers, it has become quite common, and often necessary, to transfer data between computers. This is particularly true when it is necessary to transfer information between remote facilities, each facility having its own host computer. Such remotely located computers can communicate with one another using modems connected to telephone system, or alternatively, to dedicated leased telephone lines.

Typically, in order to effect remote communication, it is necessary for an operator to be located at each host computer. In this situation, one of the operators must initiate a computer conversation at one of the host computers, with the operator at the other computer being present in order to respond to such initiation.

Certain computer networks operate automatically wherein a conversation can be initiated with a remote, unmanned host computer. The procedure for initiating such a conversation typically involves accessing the remote host computer, as by directing a telephone call through respective modems, followed by a "log-on" procedure. Gaining access through the log-on procedure can be time consuming and render access more difficult. Once communication is established, the user must then interact with a program running in the remote host computer in order to achieve a desired result.

One example of such a system might be a computerized order entry system wherein order datasets stored at a remotely located order entry computer facility must be transmitted to a central office computer to fill such orders. Each such computer typically includes a processor, a permanent storage device, such as a disk drive, and an auxiliary or buffer storage. The transfer of datasets is generally done using a spooling operation at each computer. Particularly, in order to reduce processing delays and minimize transfer time, the program in the remote host computer is operable to transfer the dataset from the permanent storage device to the buffer storage device. The remote host computer can then access the dataset more quickly from the buffer storage and transmit it over a communication network to the central office host computer. In order to hasten the receiving of the information, the central office host computer initially stores the received dataset in its buffer memory and the spooling operation is used finally to transfer the data to the permanent storage device. While such a system affords certain benefits, the transfer time may still be unnecessarily long, as the system may be delayed until the time required to perform the spooling operation at each host computer.

The present invention is directed to overcome these and other problems associated with data transfer and management.

SUMMARY OF THE INVENTION

In accordance with one aspect of the present invention, a network data manager system is operable to directly transfer a dataset from one host computer storage to another host computer storage device.

The network data manager system is intended to provide host processors with the capability of moving sequential datasets, partition datasets, or members of partition datasets between them. The data is read directly from the source dataset, which may be on a tape or disk, and is written directly to the target dataset which also may be on a tape or disk. No intermediate storage is required for queuing or spooling the data being transferred.

According to another aspect of the invention, the system permits users to interact with the system in a user friendly manner to aid in the transfer of datasets. Specifically, the users are not involved in normal system activity, but rather operate under their own control space, and transmit send and receive request commands as necessary. Such users typically operate using a CRT type display which is operated by filling in menu information to operate the system. Network data transfer can also take place under the control of a batch application program. Such batch jobs are operable to generate dataset transfer requests to a batch notification interface. The network data manager responsive thereto implements the requested command to transfer data.

In another aspect of the present invention, the system commands can be executed locally in the resident host system, or remotely in a remotely located host system.

Associated with each command is a system I.D. indicating the host system to which the command pertains. Each host includes a command manager program which ascertains the host with which the command is associated. If the command is associated with the local host, then the command manager attaches a specific task in order to implement the command. Otherwise, if the command is intended for a remote host, then the command manager attaches a remote processing task which is operable to transfer the command to the remote system over a system integrated data network.

According to another aspect of the invention, the local user can execute commands in another system without the necessity of logging on to such other system. Specifically, a local systems user interface generates a command which is transferred to its associated command manager. If such command is a remote, or cross system command, then the command is transmitted directly to the remote host computer without need for the user to log on to the remote system. In fact, the remote system is not aware of the originating location of the command.

It is another aspect of the present invention that the network data manager system is provided with a network storage subsystem for storing relevant data therewith. The subsystem is provided with primary and secondary databases so that a back up is always available, as well as provisions for culling obsolete data therefrom.

Still another aspect of the invention is to provide a security system to prevent unauthorized user's from gaining access which would enable the transfer of confidential datasets.

Further features and advantages of the invention will readily be apparent from the specification and the drawings.

DETAILED DESCRIPTION OF THE INVENTION

Figure 1:
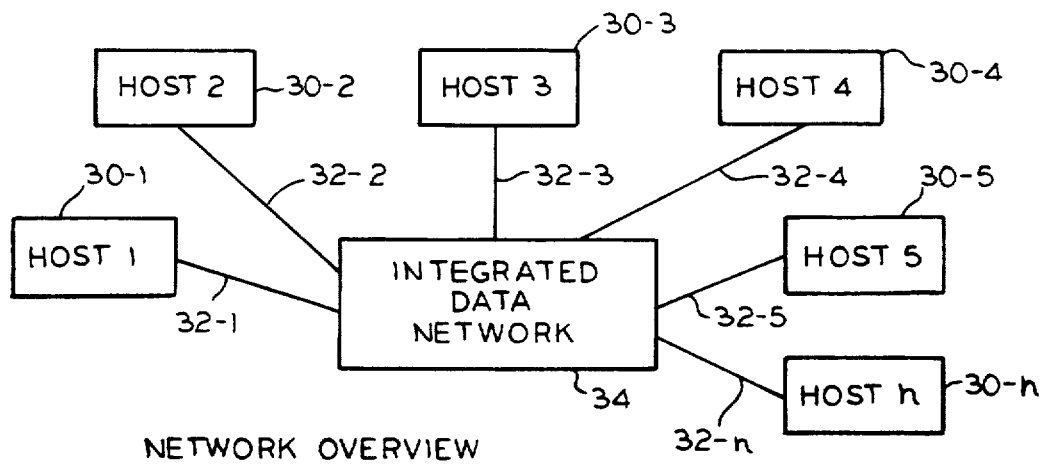
FIG. 1 is a block diagram illustrating an overall computer network according to the invention.

Referring to FIG. 1, a network data manager system according to the present invention comprises a software program which facilitates the exchange of datasets between host computer sites. Specifically, the transfer of datasets between any of a plurality of host computers 30-1, 30-2..30-N. Each of the host computers 30 is connected over an associated data-line 32 to an integrated data network 34. Specifically, a source host computer, e.g., 30-1, transmits data over its associated data line 32-1 via the integrated data network 34 to another data-line, e.g. 32-4 to be received at the target host computer 30-4.

Figure 2:
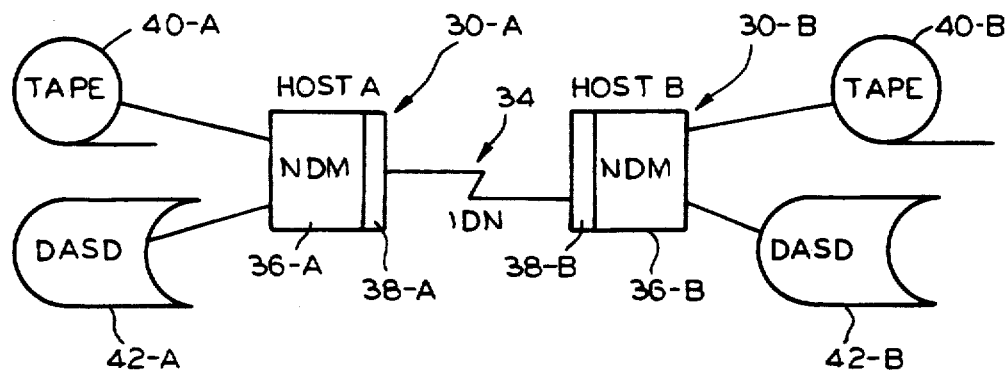
FIG. 2 is a block diagram which generally illustrates the hardware utilized in the transfer of datasets according to the present invention.

Referring to FIG. 2, a block diagram illustrates the facilities used for the transfer of a dataset from a host computer 30-A, entitled Host A to a host computer 30-B, entitled Host B. The two host computers Host A and Host B are generally similar and each includes a network data manager system program 36 and a communications subsystem 38. Each network data manager program 36 is capable of accessing, i.e., reading data from or writing data to memory storage devices such as, for example, a magnetic tape drive system 40 and/or a direct access storage device, or DASD 42. The communication subsystem 38 of each host computer is used to communicate with another host computer over the integrated data network 34. Specifically, the network data manager system 36 of each host may be operated to cause a dataset stored on either storage device 40 or 42 to be transmitted directly to the storage device 40 or 42 associated with the other host computer.

For simplicity, any element which is common to all host computers are referenced with a reference numeral having no suffix, e.g. 30. If an element is intended to refer to one host computer relative to another host computer, then a suffix is added to the numeral to distinguish between the two, e.g. 30-A and 30-B.

The datasets which are transferred between host computers may include, for example, order information, payroll information, customer information, or the like. A typical application for the system might be a national distribution system which includes order entry capability at multiple remote locations, with the orders being filled or scheduled from a central office location. In such an example, order entry information at the remote locations is stored in peripheral storage device associated with the remote locations host computer for subsequent transmission to the central office. If it is desired that the order entry information be transmitted to the central office, then the network data manager system according to the invention is operable to initiate and complete such a transfer of one or more datasets containing the order information. The order information is then acted on as necessary, or desired, at the central location. Subsequently, the central office might transmit datasets back to the remote office locations instructing the remote location to fill the orders or advising the remote location as to how the order was actually processed.

In the above exemplary application, it is assumed for purposes of explanation herein that the Host A computer is located at the remote location. Therefore, order entry data which is generated by any known means is stored in datasets on the tape drive 40-A and the DASD 42-A. Similarly, the Host B computer is located at the central office site. The central office Host B, therefore receives and stores order entry datasets transmitted from Host A's associated tape drive 40-B and DASD 42-B, as well as any other host which may be provided.

If it is desired to transmit such order information from the remote office location to the central office location, then the network data manager system 36-A of Host A initiates a conversation with the network data manager system 36-B of host B as by their respective communication programs 38-A and 38-B communicating over the integrated data network 34. When a communication link is established, the host A network data manager system 36-A reads a dataset from one of its storage devices 40-A or 42-A and transmits it to the host B network data manager system 36-B for storage on one of its associated storage devices 40-B or 42-B. Such transfer is accomplished without the need for spooling or queueing of data.

Figure 3:
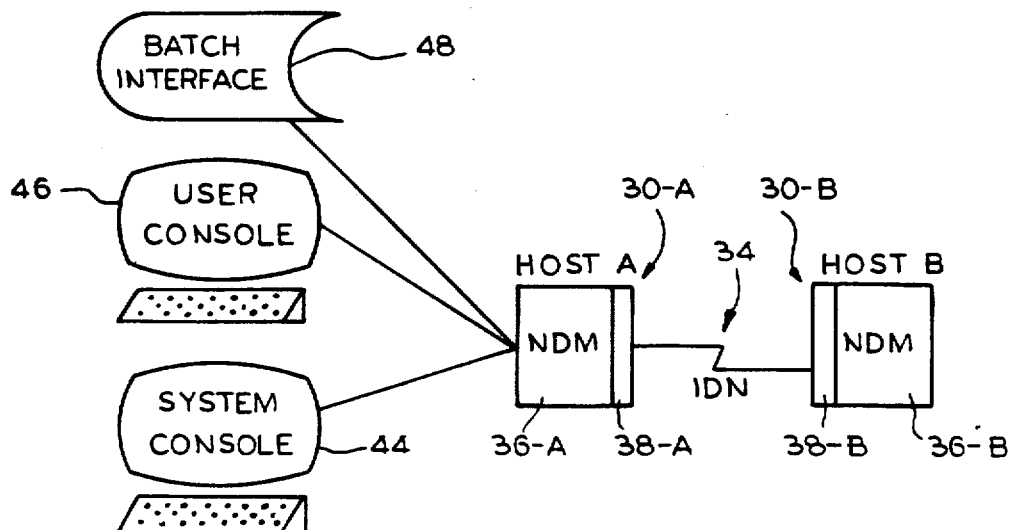
FIG. 3 is a block diagram which generally illustrates peripheral interfaces to the network data manager system.

Referring to FIG. 3, a block diagram illustrates the various interfaces associated with the Host A computer which can be utilized to initiate the transfer of a dataset, or some other type of command. Specifically, a system console 44 is used by system personnel, such as computer operators and the like, for entering commands to the network data manager 36-A. A user console 46 is used by more frequent system users using a menu driven format. Specifically, the user console 46 is used to request the sending and receiving of datasets, or to obtain status, activity and history reporting functions. A batch interface 48 allows a batch job application running on the host computer to automatically transmit a send dataset command to the network data manager system 36-A, if it is necessary that a dataset transfer occur as part of the job application. For example, the above example might have a job application program running on the remote location host computer which provides for the entry of order information data. As part of the job application, it may be necessary to periodically, such as once a day, transfer all the daily order entry information to the central office host computer Host B. When the desired transmission time occurs, a dataset send command is sent to the network data manager 36-A through the batch interface 48.

Figure 4:
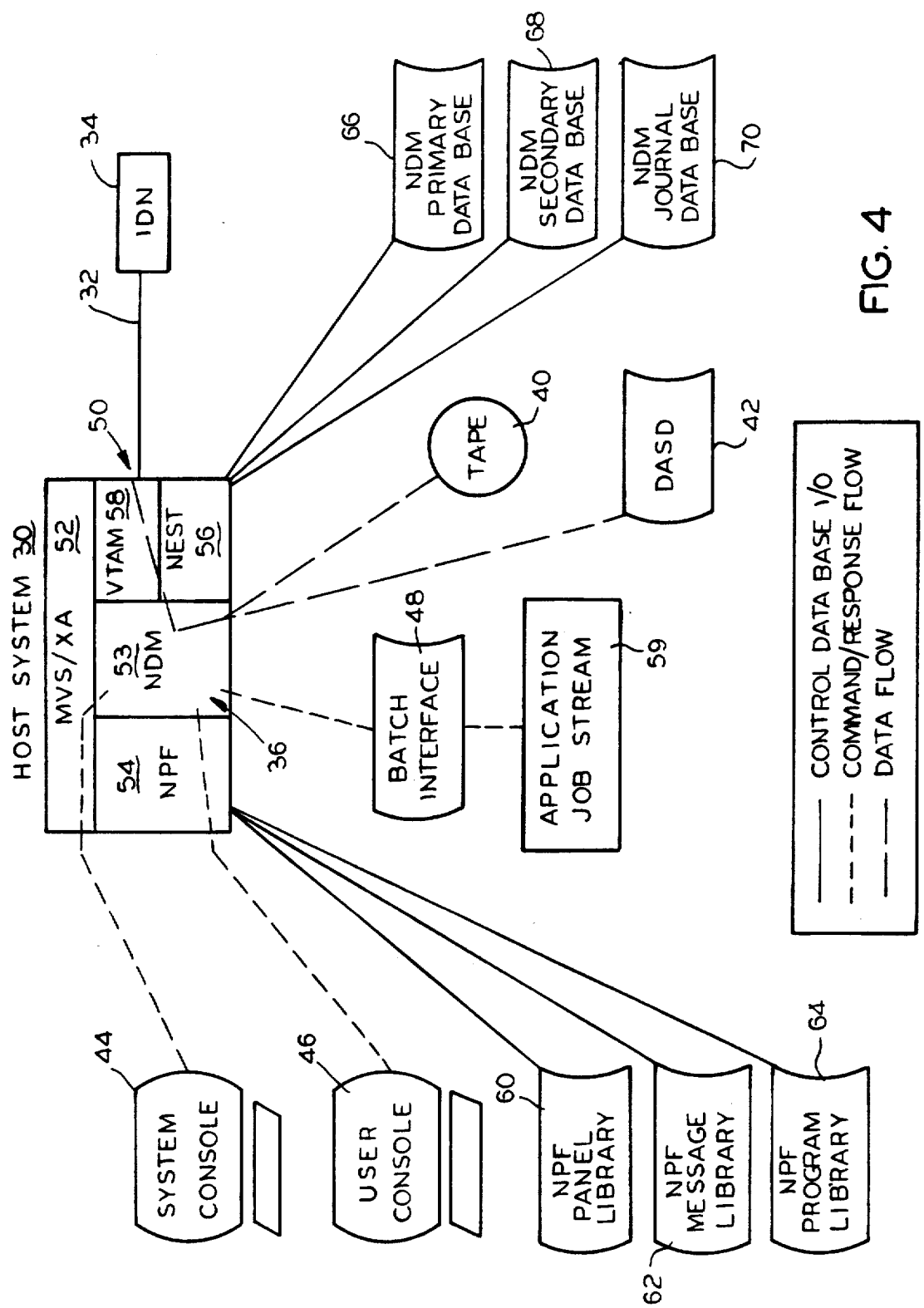
FIG. 4 is a combined hardware and software block diagram with a host computer system according to the invention.

Referring to FIG. 4, a block diagram represents certain of the hardware and software for a host computer system 30 including the communications network data manager system 36 according to the invention.

The network data manager system 36 is intended to be run on an IBM System/370 or compatible machine. The host system 30 includes suitable memory defining a memory space represented by a block 50. The memory space 50 is occupied by various software products, including the communication network data manager system 36 and an operating system program in an address space 52. The communication network data manager system 36 is intended to be run under the IBM MVS/XA virtual storage operating system. The MVS/XA operating system is designed to perform the system control programming functions in large-system environments. The communication network data manager system memory space 36 is occupied by a network data manager, or NDM, subsystem 53, a network productivity facility, or NPF, software subsystem 54, a network storage, or NEST, software subsystem 56, and a virtual telecommunications access method, or VTAM, subsystem 58.

In addition to the above, distinct application programs may be run on the host system, or may have access to the host system. Such job application programs may be operable to actually generate the data to be transferred as part of a dataset by the host system 30 over the integrated data network 34, or may receive data therefrom. Although no address space is illustrated for such an application system, it should be understood that the address space 50 may be variable in size and have address space provided as necessary for any subsystems operating on the host. In fact, the relative sizes of the block in the memory space 50 are for illustration only and do not represent the relative size of each software subsystem relative to the overall memory space.

The network data manager or NDM subsystem 53 is the primary address space in the communication network data manager system 36. Its purpose is to coordinate and control the transfer of data files over the integrated data network 32. These data files may be obtained from datasets stored in the tape device 40, or DASD 42, as is well known. The NDM subsystem 53 running on a main frame CPU transfers data to other remote NDM systems 53 running on remote CPUs. The NDM subsystem 53 includes capabilities for dataset transfer processing, command processing, communication services network interface, user interface, processing and control, and dynamic system control. The first four of these functions are supported by independent, current tasks executing in the NDM address space 53. Each of these major tasks is designed for minimal impact on one another and on system performance on the whole. The dynamic system control function is supported within each major task by designing system work using tables to be memory resident.

The network productivity facility, or NPF, subsystem 54 provides the user interface to NDM 53 via the user console 46. The user console 46 comprises a 3270 type display device with 24 row by 80 column display. According to the preferred embodiment, the NPF subsystem 54 uses the IBM time sharing TSO/E system for providing interactive computing. In order to use the TSO full screen interface, the IBM interactive system productivity facility, or ISPF, is also required. The ISPF facility provides dialog management services for users of the 3270 display terminals. The dialog management service is used to produce interactive applications in the form of menu-driven dialogs and dialog functions to provide a user-friendly interface to the NDM subsystem 53. Specifically, the NPF subsystem 54 is a menu-driven system which enables users to expedite their entry of requests and/or commands.

The NPF subsystem 54 interfaces with a database comprising an NPF panel library 60, an NPF message library 62 and an NPF program library 64. Each of these libraries stores the information to produce panels or menus utilized by the NPF subsystem 54 under the ISPF facility.

Data transfer commands can also be entered into the NDM subsystem 53 from an application job stream 59 via the batch interface 48, as is discussed in greater detail below.

The NEST subsystem 56 is essentially a database manager which may run in its own address space, as shown, or in the address space provided for the NDM subsystem 53. The sole function of the NEST subsystem 56 is to manage the databases utilized by the NDM subsystem 53. The NEST subsystem 56 provides an interface to a database of keyed information. This keyed information could consist of the control blocks, data areas or other information that lends itself to a keyed access structure. The database consists of all information that the NDM subsystem needs to keep on auxiliary storage. The database is subdivided into a primary database 66, a secondary database 68 and a journal database 70, as discussed in greater detail below.

The NEST subsystem 56, comprising the databases 66, 68 and 70, utilizes a virtual storage access method, or VSAM. VSAM is an access method for direct or sequential processing of fixed and variable-length records on direct access devices i.e., a DASD. The NEST subsystem 56 always maintains an open access control block to the database for servicing the read and write requests. The NEST subsystem 56 serves requests from other address spaces in a "first in - first out" manner.

The VTAM subsystem 58 is an IBM product which provides the base for the overall communication system. Specifically, the VTAM subsystem 58 provides an operating system for communication from each host system 30 to the network 34 over the data-line 32. Its functions are analogous to the functions of a host operating system in terms of resource sharing and logical handling of user requests.

In the preferred embodiment, the integrated data network 34 is a conventional SNA Network, which operates under the formats and protocols of the systems network architecture (SNA). The VTAM subsystem 58 interconnects the host computer 30 with the SNA network 34. Resultantly, each host computer 30-1 through 30-2 can access applications running in the other host computers in the network. This cross network communication takes place transparent to the user. Illustratively, a user operating the user console 46-A at Host A can access applications running on, for example, Host B without even being aware of such cross network communication. The interconnection is provided by the VTAM subsystem 58-A and 58-B in the host computer communicating with one another via the network 34.

Figure 5:
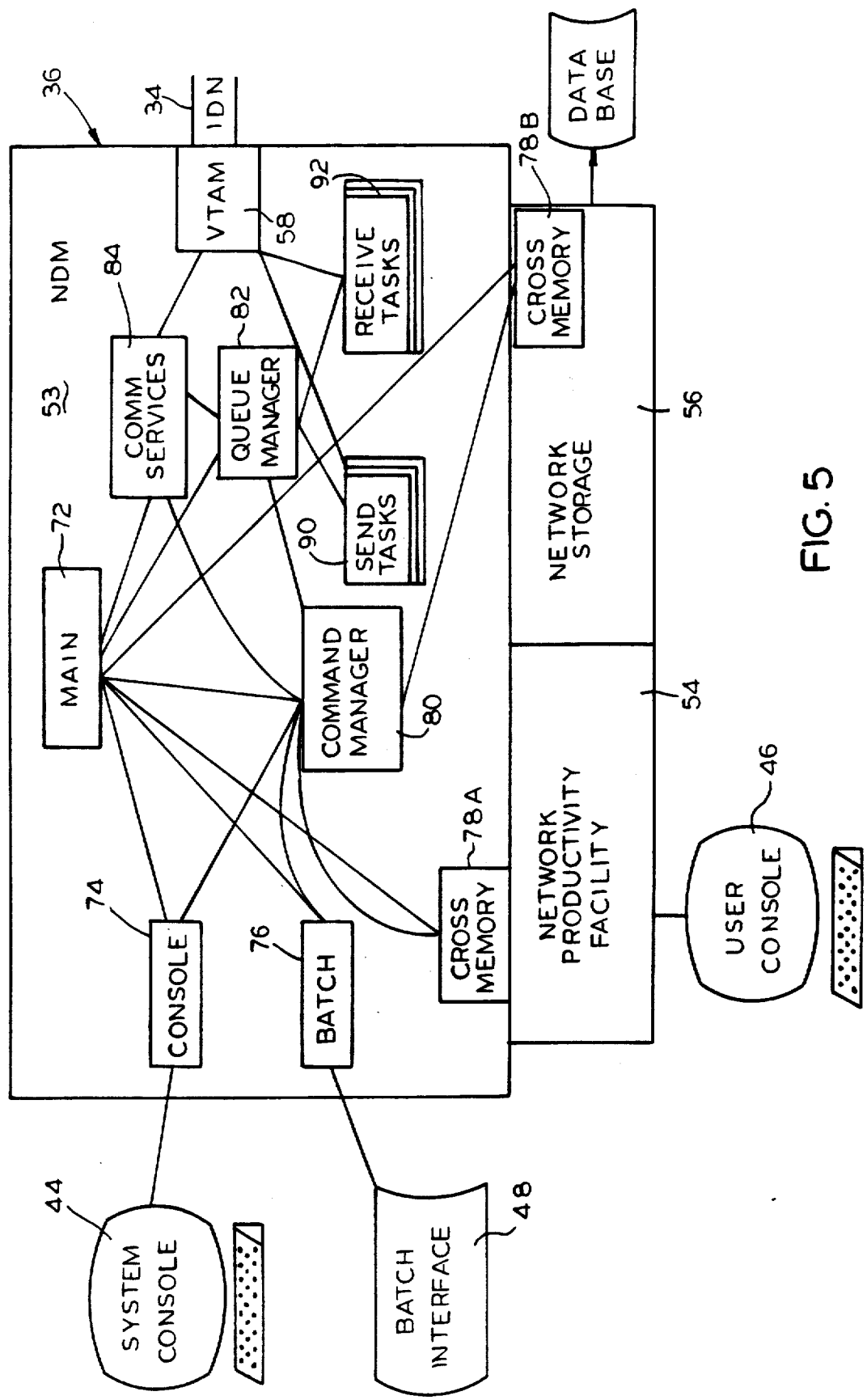
FIG. 5 is a generalized flow diagram which illustrates data transfer paths in a portion of the address space of the host computer.
Figure 6:
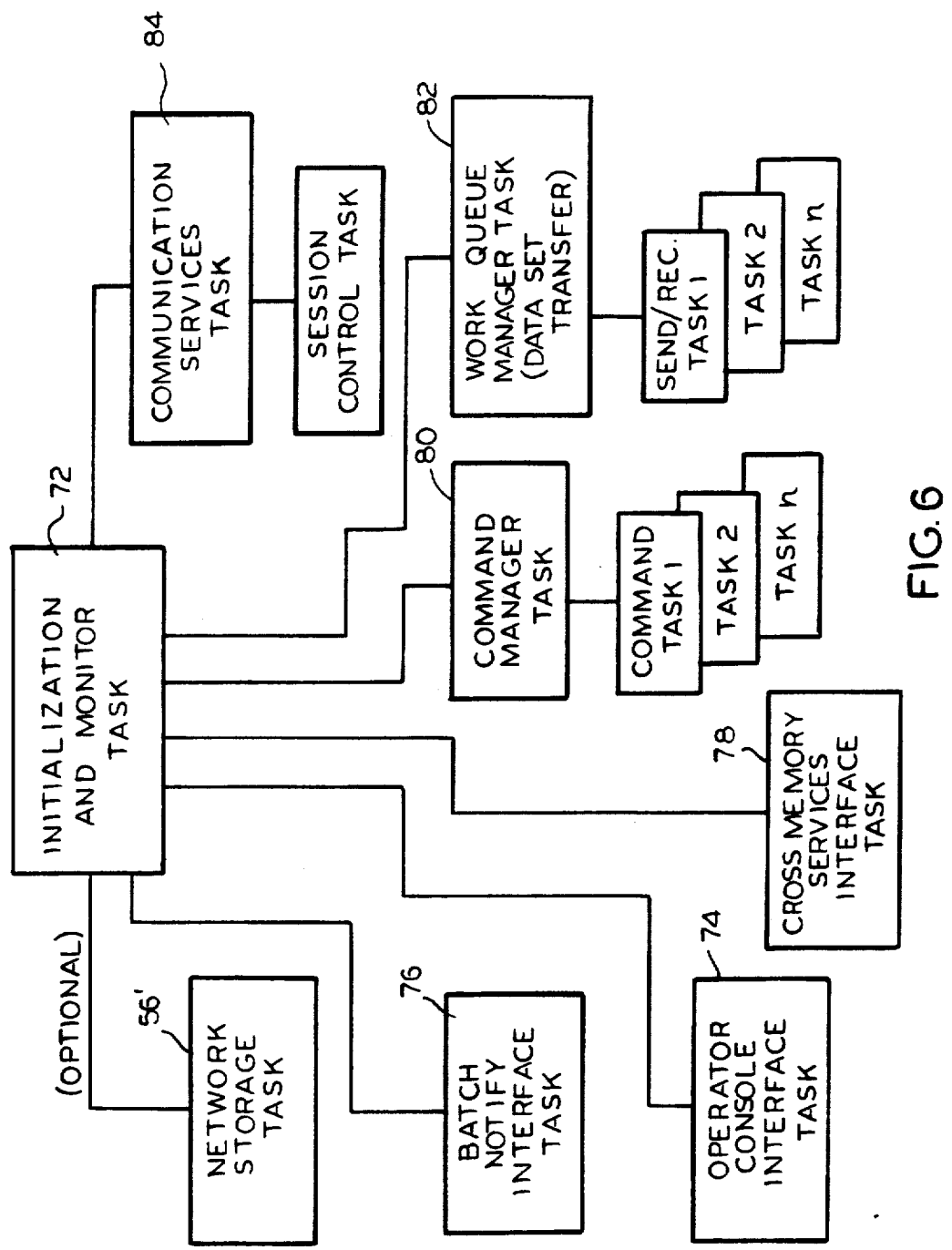
FIG. 6 is a block diagram which illustrates the major software tasks of the network data manager system.

Referring to FIG. 5, a block diagram illustrates the program tasks which are resident in the NDM address space 36 and how such tasks interface with peripheral devices. Referring also to FIG. 6, a block diagram illustrates the tasks of the NDM subsystem 59.

Specifically the NDM subsystem address space 53 includes a main, or initialization and monitor, task 72, an operator console interface task 74, a batch notify interface task 76, a cross memory task 78, a command manager task 80, a queue manager task 82 and a communication services task 84.

The main task 72 communicates with each of the other tasks. When the NDM subsystem 53 is initialized, the main task 72 is responsible for initializing and attaching the tasks 74–84. The main task also creates a system nucleus including obtaining storage areas, setting system parameters, service routines, initializing chain pointers, loading user exits, among others.

All communication between tasks or modules is through a nucleus. The nucleus is a common storage area in the NDM system address space 36 which all the tasks have access to. The nucleus contains the anchor blocks for the system work queues. The work queues are chains of control blocks which identify the pieces of work currently in progress or pending. The queues which are anchored in the nucleus include a send pending queue, a receive pending queue, a send active queue, a receive active queue and a free queue.

The send pending queue is a change of send pending queue elements (SPQE) which contains all the information for a pending or interrupted dataset send request. Each SPQE in the chain is backed by a corresponding SPQE in the NEST subsystem 56. At system initialization, the SPQE's are read from the NEST subsystem 56 and the send pending queue is built in memory. The NEST copy of the SPQE is for back up purposes only, the copy in memory being used for all processing.

The receive pending queue is a chain of receive pending queue elements (RPQE) which contain all the information for pending or interrupted dataset receive requests. Each RPQE in the chain is backed by a corresponding RPQE in the NEST subsystem 56, as above.

The send active queue is a chain of send active queue elements (SAQE) which is the working storage control block for an active send task, see 90 below. Each SAQE has an active send task 90 associated with it. Each SAQE in the chain is backed by a corresponding SAQE in the NEST subsystem 56, as above. An SAQE is created by the work queue manager task 82 when creating a send task.

The receive active queue is a chain of receive active queue elements (RAQE) which is the working storage control block for an active receive task, see 92 below. Each RAQE has an active receive task 92 associated with it. Each RAQE in the chain is backed by the corresponding RAQE in the subsystem 56, as above. An RAQE is created by the work queue manager task 82 in creating a receive task.

The free queue chain is a list of queue elements which are not used and are available to be used to build SAQE's, RAQE's, SPQE's and RPQE's. The service routine pointed to by the nucleus can be called by any module which needs a queue element.

Remote NDM definition entries (RSDE) are chained in memory just like working queue elements. RSDE's are used to define other NDM subsystems 53-n with which the local system can communicate. Each RSDE in the chain is backed by a corresponding RSDE in the subsystem 56.

Because of the multi-task nature of the NDM subsystem 53, many of the data areas are shared by multiple tasks which require serialization to avoid conflicting updates. There are two methods of serialization employed by the NDM subsystem 53. The first is the use of the system facility ENQUE and DEQUE. The send pending queue, send active queue, receive pending queue, receive active queue and remote SNDM definitions are serialized using ENQUE and DEQUE. The second type of serialization, utilized by the remaining resources is the use of the "compare and swap" or "compare double and swap" instruction. The system 370 hardware forces serialization of the execution of these instructions ensuring the integrity of the storage being updated. These instructions are used to update storage locations which might be updated by multiple tasks. They can be used to add or remove elements from a chain only if the chain is a likely stack.

The operator console interface task 74 provides an interface to the NDM subsystem 53 to a user of a system console 44, which is capable of interfacing with an MVS/XA system. The system console 44 is used to enter line entry commands, and are subject to the MVS restriction that they do not exceed 126 characters in length.

The batch notify interface task 76 provides access to the NDM subsystem 53 as part of its normal execution through standard job control language, or JCL. Specifically, a application job stream 59 submits data transfer requests to the batch interface 48 which communicates with the batch notify interface task 76. Such job streams require a JCL step to execute a batch NDM program to place send requests in a VSAM file, as discussed more specifically below.

The batch interface task 76 receives its input from a DASD dataset. The task periodically reads the notify dataset to see if a job has placed a command in the dataset.

The cross memory services interface task 78 is a feature of MVS/XA which allows programs running in separate and distinct memory spaces to access one another. Utilizing the cross memory services feature, each task operates in its own address space, and the cross memory service is utilized only when it is necessary to access memory associated with the other tasks.

The cross memory interface task 78A receives its input via a routine executed from the NPF address space 54. The cross memory services interface task 78A moves a command to the NDM subsystem 53. If the NEST subsystem 56 operates in its own address space, it also communicates with the NDM subsystem 53 through a similar cross memory services interface task 78B.

Users at the user consoles 46 enter commands and requests independently of and without interaction with the NDM subsystem 53. When it is necessary to transfer a command to the NDM subsystem 53, such as when it is desired to initiate a dataset send request, the NPF subsystem 54 transfers the command to the NDM subsystem 36 via the cross memory services interface task 78A. In so doing, there is no requirement that the TSO user log on to gain access to the NDM subsystem 36.

The command manager task 80 initiates and controls any command tasks. Specifically, commands enter the NDM subsystem 36 through one of the other interface tasks. Each one of the interface tasks obtains commands from an input media, as illustrated. For example, the operator console interface task 74 receives commands from the system console 44.

Each of the interface tasks formats data received from its input media into a Request Common Control Block (RCCB). The RCCB is then chained to the command manager's process queue and the command manager's wake up event control block is posted. The RCCB storage is obtained from a chain of free RCCB's which are built by the initialization and monitor task 72. The RCCB consists of three segments:

1. The first segment contains the information that the system needs to route the command and its response through the system;

2. The second segment is an interface dependent segment which contains the information needed by the interface tasks to process the command and return the response; and 3. The third segment contains the command or response data. The format of the data is dependent on the command and subcommand contained in the first segment.

The command manager only utilizes the first segment of the RCCB. When the command manager finds the command in its process queue, it attaches a task to process the command. The task which is attached is referred to as the command task. The task name which is attached is constructed using the command code as part of the task name. New commands can be added without requirement of any changes of the command manager. The RCCB is passed as the only parameter to the command task.

The command task processes the command contained in the third segment of the RCCB. The response is built in the third segment of the RCCB by replacing the command data. Each command always requires a response. The response consists of two parts—a command return code and the response data. Some commands may only have a return code and no response data. The RCCB contains the address of the queue where the response is to be placed and an event control block, or ECB, to be posted after the response has been placed on the queue. Each of the interface tasks has a separate queue and wake up ECB. The command task does not know which interface task the command came from, or where it is being returned.

When the interface task wakes up and finds a response on its response queue, the interface formats the raw response data into whatever format its interface media requires and passes the response out of the NDM subsystem 53. The output format varies depending on the interface task as follows:

The console interface task 74 formats the data into write to operator commands which are written to the operator console from which the command came.

The batch notify interface task 76 puts the response back in the dataset to be picked up by the batch notification program.

The cross memory services interface task 78 moves the response to the address space from which the command came and does a cross memory post of the ECB provided by the address space.

The communication services control task 84 returns the response to the host computer 30-N from which the command came, who in turn returns the response to one of the interface tasks on that system.

The interface task then returns the RCCB storage to the free RCCB chain.

The command manager's process queue chain and the interface response queue chains are set up in a last in first out manner. Therefore, serialization is achieved by using the compare and swap instruction to add and remove elements from the chain.

The command manager task 80 is used to process commands entered into the NDM subsystem 53 through one of the other interface tasks. Specifically, the user interface tasks pass the input commands into the command manager's process queue. Included in the first segment of each such command is a system i.d. indicating the host computer system which the command is to be routed to for action. When the command is selected for operation, the command manager task 80 compares the command system i.d. to the local NDM subsystem i.d. to identify whether the command is a local command or a remote command. Remote commands are passed to the VTAM interface 58 to be routed to the appropriate host computer, as discussed below.

The command manager task 80 verifies a user's authority to execute a command by calling an installation exit. Each local command accepted by the command manager task 80 creates a new command task. Responses to user commands are generated back to the interface task by the command tasks. The command task does not know which interface task the command is received from, and may access any NDM system queues, tables or NEST records while processing commands. From the users perspective, the commands execute synchronously, while internally they are processed asynchronously.

Figure 7:
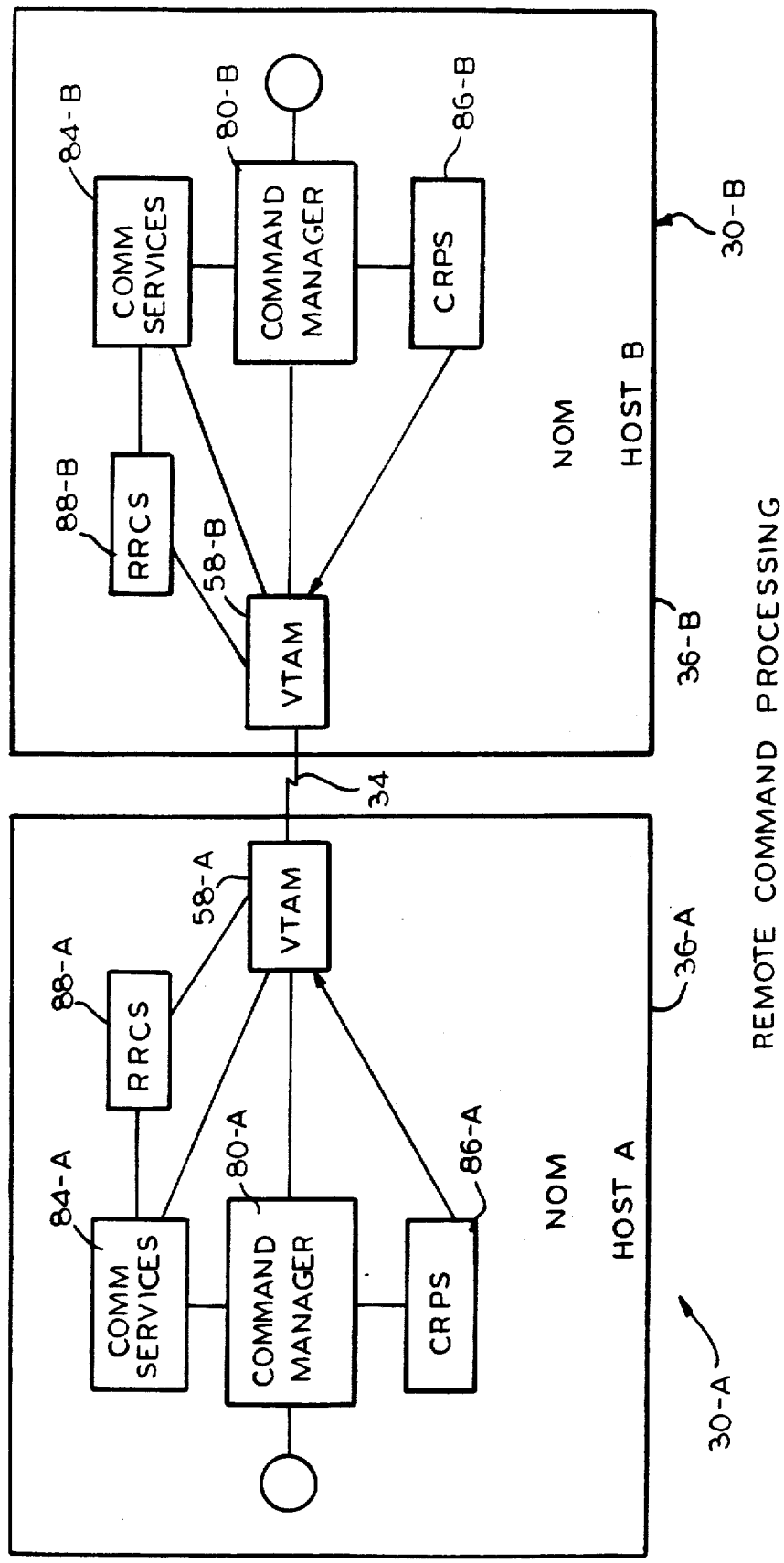
FIG. 7 is a block diagram which illustrates the software tasks used for remote command processing.

Referring also to FIG. 7, a block diagram illustrates the tasks which are utilized to process remote commands. Specifically, in each host NDM system 36, the command manager task 80 attaches a command task for remote processing services, or CRPS, 86 if a command is to be passed to a remote host system. In the remote host system, the command task for remote response communication services, or RRCS, is used in conjunction with the communication services task 84, for implementing a conversation between hosts, as discussed in greater detail below.

The work queue manager task 82 determines when a send or receive task can be attached and handles the creation of send and receive tasks 90 and 92, respectively. One of the types of commands processed by the work queue manager task 82 is a request from a remote NDM subsystem 36-B to transmit a dataset to the local NDM subsystem 36-A. The communications control services task 84 passes the request to the queue manager task 82. The queue manager task 82 attaches a receive task 92 which is then responsible for the conversation. Similarly, the queue manager task 82 can receive a send request command from the command manager task 80. When such a command is received, the queue manager task 82 attaches a send task 90 which is then responsible for initiating a conversation over the integrated data network 34 through the VTAM interface 58.

The communications services task 84 has three primary functions:

1. Receive commands from a remote NDM system 36;

2. Receive requests to transmit data from a remote NDM system 36-B;

3. Return responses from command tasks to a remote NDM system 36-A.

The communications services tasks 84 receives all unsolicited data requests from the data network 34. These unsolicited requests are either commands or requests to send a dataset. When the commands are received, the communication services tasks 84 passes the request to the command manager 80. When a request to send a dataset is received, the communication services task 84 passes the request to the work queue manager task 82. The work queue manager task 82 subsequently attaches a receive task, as discussed above.

Figure 8:
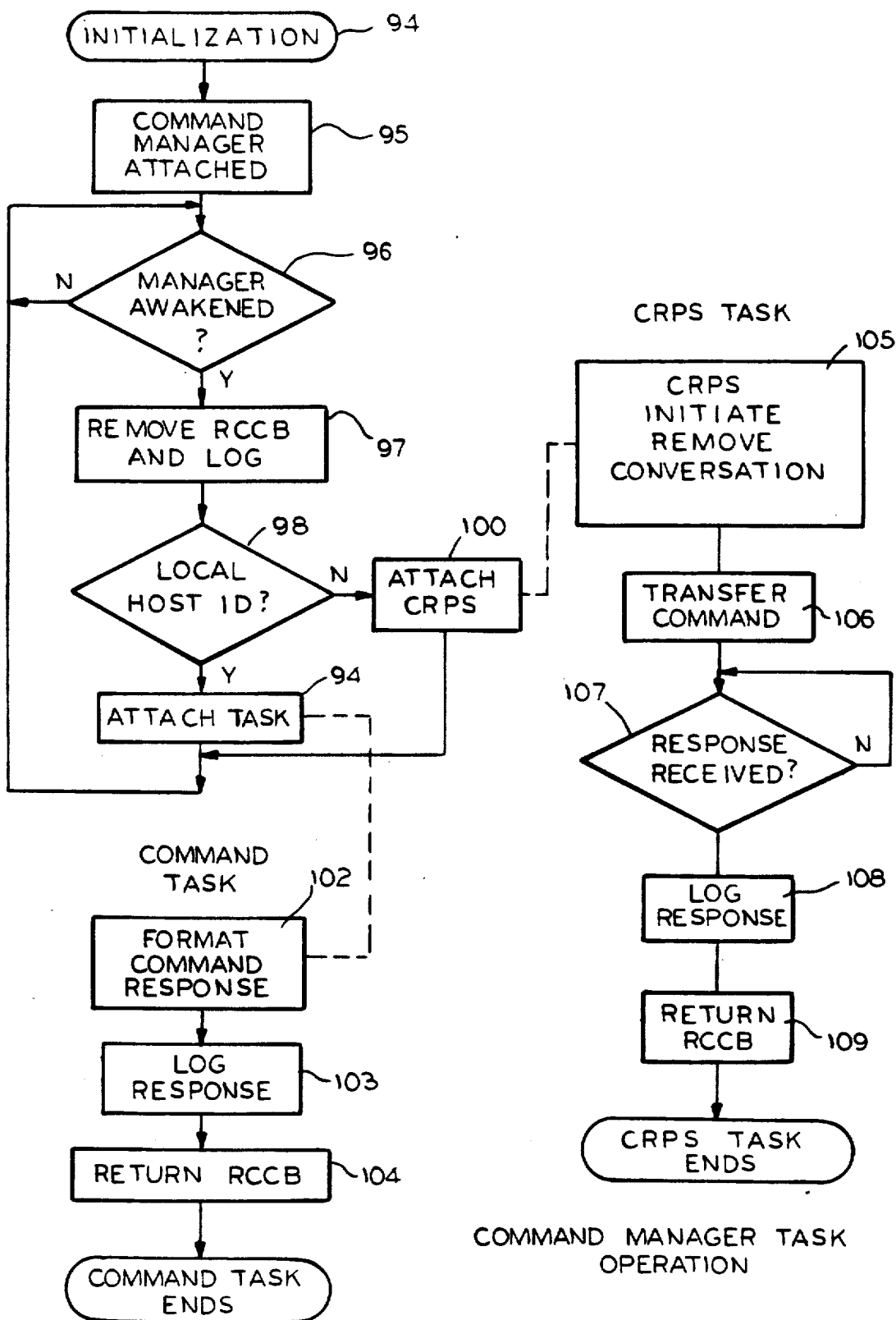
FIG. 8 is a flow diagram which illustrates the operation of a command manager task.

Referring to FIG. 8, a flow diagram illustrates the operation of the command manager task 80. The operation of the command manager task 80 begins at a block 94 with the initialization of the NDM subsystem 36. Subsequently, the command manager task 80 is attached at a block 95 by the initialization and monitor task 72. Thereafter, a decision block 96 determines whether or not the command manager task 80 is awakened as by the command manager task being awakened with an RCCB in its process queue. If not, then control remains at the decision block 96. If a command is received, then at a block 97 the command manager task 80 removes the RCCB from the chain of pending commands and logs the command. A decision block 98 determines whether or not the command is for the local host system or a remote host system. If the system i.d. is for the local host system, then a command task is attached at a block 99 to perform the command. The actual task which is attached depends on the command code in the RCCB. If the command has a system i.d. for a remote system, then the command manager task 80 attaches the CRPS task 86, see FIG. 8, at a block 100. Then control returns to the decision block 96. When a response is received the command task formats the response at a block 102, then the response is logged at a block 103, and at a block 104 the RCCB is returned to the chain so that it may be passed back to the interface module where the command was initially generated. The RCCB contains the chain anchor block pointer for the interface module and the ECB to be posted to wake up the interface module. The command task has no knowledge of and does not care which interface passed the command or received the response.

Also illustrated in FIG. 8 is the operation of the CRPS task 86. Specifically, if the CRPS task 86 is attached at the block 100, then at a block 105 the CRPS task 86 initiates a remote conversation with the remote host corresponding to the system i.d. of the command in the normal manner. The processing command at the remote site is described in greater detail below relative to FIG. 9. Once a conversation has been initiated, then the command is transferred to the remote NDM system 36-B at a block 106. The decision block 107 then waits for the response to be received, and when a response to the command has been received, then the response is logged at a block 108 and the response returns the RCCB to the interface task at a block 109. Then the CRPS task 86 ends.

Figure 9:
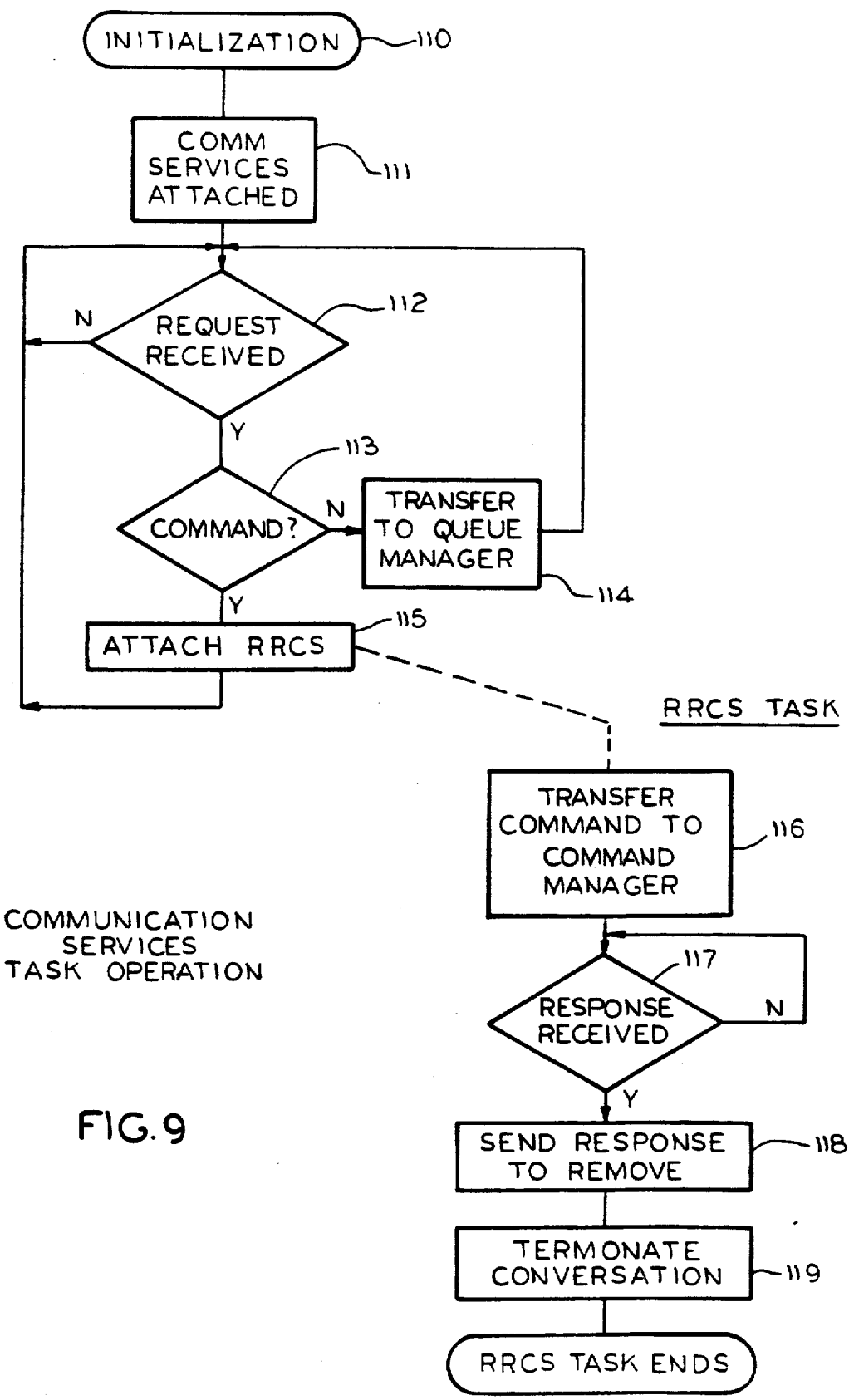
FIG. 9 is a flow diagram which illustrates the operation of a communication services task.

Referring to FIG. 9, a flow diagram illustrates the operation of the communication services task 84. The NDM subsystem 53 is initialized at a block 110. Thereafter, the communication services task 84 is attached at a block 111, as discussed above. A decision block 112 determines whether or not an unsolicited request has been received from the data network 34. If not, then the task recycles on block 112. These unsolicited requests are either commands or requests to send a dataset. If so, then a decision block 113 determines whether or not the request is a command. If it is determined at the decision block 113 that the request is not a command, then the request comprises a request to transmit a dataset from a remote NDM subsystem. Therefore, at a block 114, the communication services task 84 passes the request to the queue manager task 82, and returns to the decision block 112.

If the request is a command, as determined at the decision block 113, then the RRCS task 88 is attached and the command is transferred to it at a block 115, resulting in the command being transferred to the command manager 80 at a block 116. A decision block 117 determines whether or not any response has been received. If so, this response must be transmitted to the remote NDM subsystem which initiated the command. If a response is received, then the RRCS task 88 subsequently communicates with the remote host system over the integrated data network 34 as indicated at a block 118, to pass the response back as part of the original conversation and to terminate the conversation at block 119 and then ends.

To initiate the transfer of a dataset from the Host A system to the Host B system, a send task 90-A in the Host A system must communicate with a receive task 92-B of the Host B system. The send task 90-A is attached by the work queue manager task 82-A, and is operable to read a dataset directly from a DASD 42 or tape device 40, see FIG. 4, and pass the dataset through the VTAM interface 58-A to be transmitted to the remote system 30-B. No intermediate spooling or queueing of the dataset is required.

When the send task 90 is attached by the queue manager 82, the task is passed the address of an SAQE which is on the active queue. The send task 90 is then responsible for the processing of the request. No other tasks are involved. The send task 90 must handle all abnormal termination of the request and either create a history record or put the SAQE back on the pending queue. The send task must provide all recovery conditions including the detaching of the task by the work queue manager 82. If the send task 90 is unable to perform the processing to normal completion, then it must place the SAQE back on the pending queue to set the appropriate hold, interruption and completion codes. If the send task appends, it must be able to perform appropriate clean up processing.

The receive task 92 is also attached by the work queue manager task 82. The function of the receive task 92 is to receive data from the VTAM interface 58 and write it directly to a dataset on a DASD 42 or tape 40. No intermediate spooling or queuing of the dataset is required. The receive task 92 performs the opposite functions of the send task 90. It is attached by the queue manager 82 when a request to send a dataset is received from another NDM subsystem. The receive task 92 is passed the address of the RCCB which contains the information necessary to complete a conversation with the send task 90. The receive task 92 must first match the send request to the appropriate receive parameters, as discussed below. If the request is an interrupted request, the task must locate the RPQE and start from the last check point. Once the receive task 92 has located or built the RAQE and put it on the receive or active queue, it must return the RCCB to the free RCCB queue.

The following chart illustrates the structural flow conversation between a send task and a receive task and the operation of transferring a dataset. The chart is broken up into operations performed by the send task illustrated in the left column, operations performed by the receive task illustrated in the right column, and any operations performed in or through the integrated data network, in the middle column and which also illustrates a particular step number.

quest to send dataset includes a send request. The receive task is responsible for matching the send request to receive parameters at the target Host B as discussed in greater detail below. Also, the receive task 92-B builds an RAQE. If the above cannot be completed, for example no match can be found, then the conversation terminates. Assuming everything is in order, then at a step 4, the receive task 92-B sends a permission to send dataset PTSD signal back to the send task 90-A to be transmitted. The send task 90-A then allocates and opens an input dataset. The input dataset comprises a

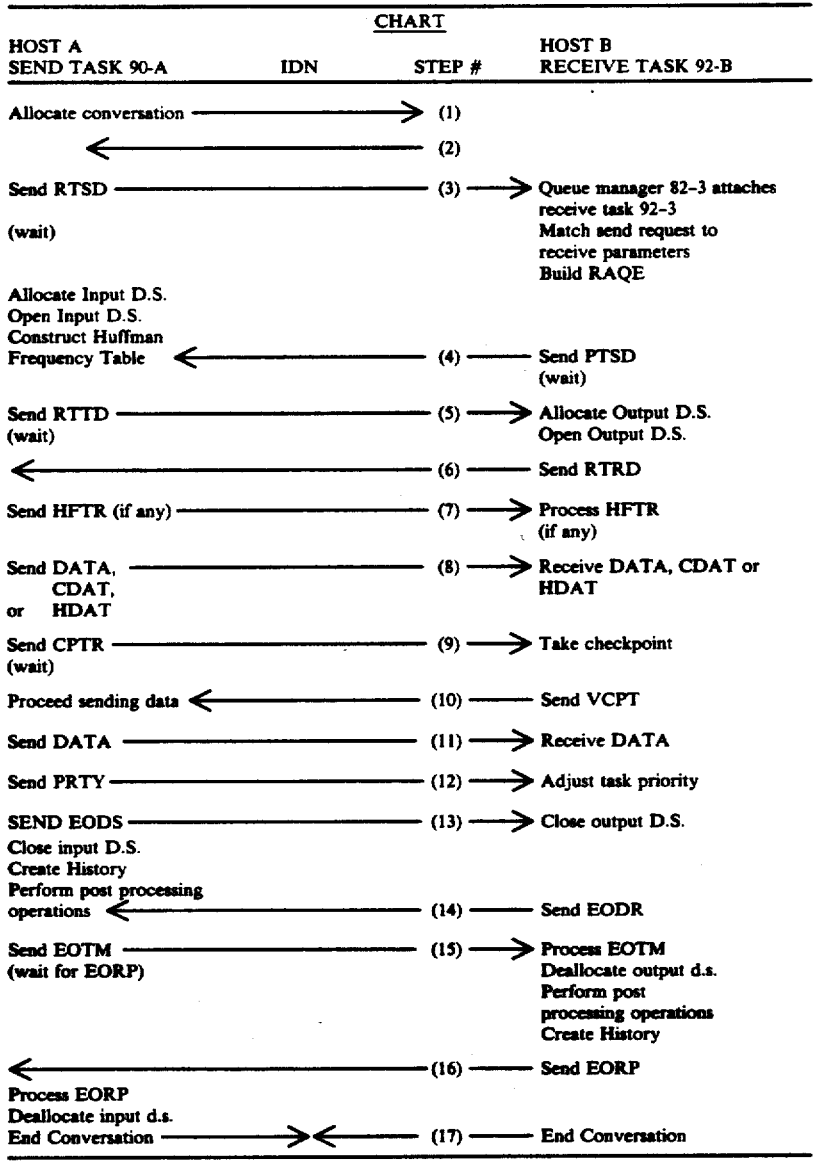

If a send task has been attached by the queue manager, as discussed above, then at step 1 the send task 90-A allocates a conversation over the integrated data network, which provides the appropriate interconnection at a step 2. Once the conversation has been initiated, then the send task 90-A sends a request to send dataset (RTSD) to target Host B at step 3. At the target Host B, the communication services task 84-B, as discussed above relative to FIG. 9. The queue manager task 82-B then attaches the receive task 92-B. The redataset file stored on either the tape 40A or DASD 42-A. If necessary, the send task 90-A also creates a Huffman frequency table to provide for the compression of data, as is well known. If, however, the data is already compressed, then such a table need not be completed. Once this is completed, the send task 90-A sends a ready to transmit (RTTD) signal to the receive task 92-B at a step 5 resulting in the receive task 92-B allocating and opening an output dataset where the received dataset is to be stored. The output dataset is a dataset file on the tape 40-B or DASD 42-B. At a step 6, a ready to receive dataset signal RTRD is sent from the receive task 92-B to the send task 90-A.

If a Huffman frequency table is created, then it is sent at a step 7 to the receive task 92-B which processes the same. Thereafter, at a step 8, the send task 90-A begins sending the dataset opened at step 4 to the receive task 92-B. The dataset may be in the form of non-compressed data (DATA), character compressed data (CDAT), or Huffman compressed data (HDAT), as is well known. While the dataset is being transmitted, it may be desired at certain check points to verify that the transmission is progressing. In the example illustrated in the chart, a check point record (CPTR) signal is sent to the receive task 92-B at a step 9, which takes the check point. If no errors are found, then a check point VCPT signal is returned to the send task 90-A at a step 10 which resumes sending data at a step 11. Also, during the transmission if it is necessary to change the priority of the task, then the send task transfers a priority change notify PRTY signal when indicated at the step 12, resulting in the receive task 92-B adjusting the task priority.

When the transmission of the dataset is completed, then the send task 90-A sends an end of dataset (EODS) signal at a step 13. Responsive thereto, the receive task 92-B closes the output dataset and sends an end of dataset received (EODR) signal back to the send task 90-A at a step 14. The send task then closes the input dataset, creates a history record and performs post processing operations and continues clean up. Once the post processing operations have completed, then at a step 15 an end of transmission (EOTM) signal is sent to the receive task 92-B which processes same, deallocates the output datasets, preforms post processing operations, creates a historical log, and returns an end of receive processing (EORP) signal back to the send task 90-A at a step 16. Resultantly, the send task 90-A processes the EORP and the conversation is terminated at a step 17.

Figure 10:
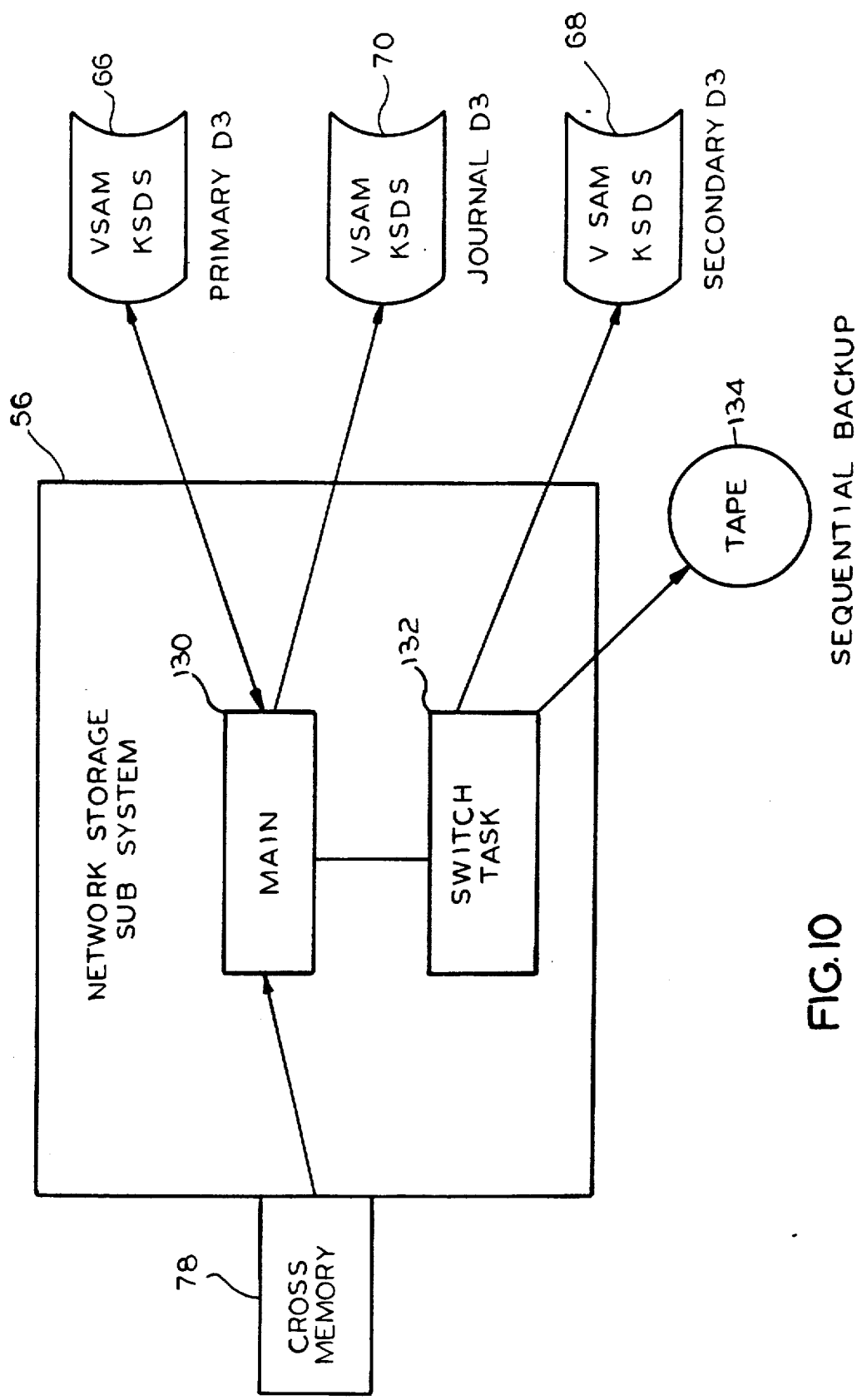
FIG. 10 is a block diagram which illustrates the transfer of data within the network storage subsystem according to the present invention.

Referring to FIG. 10, a block diagram for the NEST subsystem 56 is illustrated. Specifically, the NEST subsystem 56 communicates with the NDM subsystem 53 via a cross memory services interface task 78B contained in the NEST subsystem, see FIG. 5. Alternatively, the NEST subsystem 53 could be resident as a task in the NDM subsystem as illustrated by a task block 56', see FIG. 6. The advantages of running the NEST subsystem 56 in its own database include: it is independent of other address spaces and not subject to any problems that may occur in any other address spaces; the NEST subsystem 56 can service requests from multiple requesting address spaces; and the cross memory interface forces total independence and clean interface practices. Interface to the NEST subsystem address space 56 is via a PC instruction through a routine in the NEST subsystem address space 56.

The NEST subsystem 56 includes a main task 130 and a switch task 132. The main task 130 interfaces with the primary database 66 and the journal database 70, while the switch task 132 interfaces with the secondary database 68, and an optional storage device 134 which is provided for sequential back up.

The primary and secondary databases 66 and 68 consist of a VSAM KSDS with a 64 byte key. The system always maintains an open access control block, or ACB, to the primary database 66 for servicing read and write requests. The NEST subsystem 56 services requests from other address spaces in a first in, first out manner. The types of requests which are serviced by the NEST subsystem 56 include:
Read to database record
Write to database record
Erase a database record
Retrieve statistics about database
Initiate a database switch operation
Terminate the NEST subsystem Records are read from the database by passing a 64 byte key and other option indicators to the NEST subsystem 56. The other options indicate whether the record is to be read subsequently or as a direct key search, and for a direct request, whether the requestor will accept a record whose key is greater than the key provided by the requestor, and whether the next record is to be read in a forward or a backward sequence, relative to the sequential reads and direct reads with keys greater than or equal to only.

A record is written to the database by passing the record to the ENST subsystem 56. This may be done synchronously or asynchronously. Records are erased from the database by passing the key of the records to be erased.

The switch task 132 is utilized when a database switch operation is initiated. This task provides for switching between the primary and secondary databases 66 and 68. The NEST subsystem 56 provides for the dynamic degassing, culling, back up and recovery of its databases. Due to the use of a VSAM KSDS database for data storage, it is necessary to periodically degas the system. The VSAM characteristic of control area and control interval splits cause wasted space, or gas, to build up in the database. Resultantly, the dataset eventually runs out of space. Normally, a database is degassed by copying it to another dataset and then copying it back. However, this copying process is time consuming, resulting in a loss of access to the database during the time which the process is running. The NEST subsystem 56 provides the ability to dynamically degas the system using the secondary database 68 and the journal database 70.

The database which is currently being used is referred to as the primary database 66 and the inactive database is referred to as the secondary database 68. Only the primary database 66 is used for servicing user requests. The database switch operation is performed by opening the secondary database 68 and copying data from the primary database 66 to the secondary database 68. This copying function is performed by the switch task 132 being initiated in the address space at the time when switching is to occur. The copying operation is performed by the switch task 132 while the main task 130 continues to service input and output requests to the primary database 66. Any updates to the primary database 66 performed while its copy operation is in progress are kept in memory. When the copy operation is complete, data updates are processed against the secondary database 68. The main task 130 continues to service the input/output requests against the primary database 66 during this update phase also. When the switch task 132 catches up with the main task 130, and the two databases 66 and 68 are in sync, the secondary task 68 terminates, and the main task 130 closes the primary database 66 and opens the secondary database 68 as a new primary database. The old primary database becomes the secondary database and the switch operation is complete. The new secondary database 68 thus becomes a back up for the new primary database 66 even though it contains gas.

The switch operation may be initiated by the main task 130 by any of the following events:
 a switch command from another address space;
 the specified time interval between switches has elapsed;
 the primary database 66 has reached the specified percentage of utilization;
 the journal database 70 has reached the specified percentage of utilization; or
 a new database is introduced to the system during initialization.

The journal database is a VSAM entry-sequence dataset, or ESDS. Updates are sequentially added to the end of the dataset. As part of the dataset switch operation, the journal database 70 is reset and recording begins at the beginning of the dataset. The journal database 70 is therefore always kept in sync with the secondary database 68.

The journal database 70 is provided in the event of loss of access to the primary database 66. Specifically, the secondary database 68 may not be current enough to provide adequate recovery. Any updates made to the primary database 66 since the last switch operation are not reflected in the secondary database 68. Therefore, the NEST subsystem 56 provides for the journaling of updates made to the primary database 66. In the event of loss of access to the primary database 66, the journal database 70 can be processed against the secondary database 68 to build a new primary database 66 without any loss of data.

primary database 66 is lost while a switch operation is in progress, then the secondary database 68 is not usable. Therefore, the tape back up 134 is used to provide a duplicate of the primary database 66 prior to the switching operation. The journal database 70 can be processed against this tape back up to provide complete recovery capability during the switch operation.

The culling function is provided by deleting records from the database which have passed their expiration date. Each record type in the database is assigned a retention. When this retention time has expired, then the records are eligible to be deleted. During the switch operation, each record being copied is checked to see if its retention time has expired. If so, then it is not copied, thus freeing up space in the new copy of the primary database.

The network product facility, or NPF, subsystem 54, is the full screen TSO interface to the NDM subsystem 53. It is executed on the 3270 type display device 46 in a 24 row by 80 column format. Specifically, the NPF subsystem 54 provides a menu driven display interface which is user-friendly. Each menu consists of a display panel which allows a user to select various options or to fill in the blanks in order to proceed. Each panel is configured using the ISPF facility. Using this facility, if a TSO user executes a menu option, then the NPF system converts this to a command which is transferred to the NDM system 53 as discussed above.

The following panel #1 indicates the main user menu, known as the NPF primary options menu 150. Also, referring to FIGS. 11a-11f, a series of interrelated block diagrams illustrate hierarchy of menus in the NPF system 54.

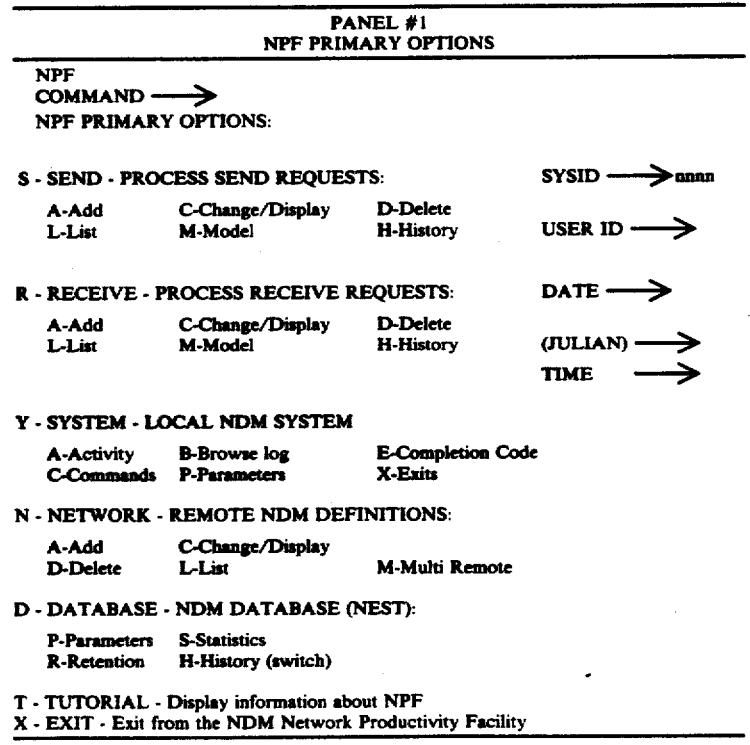

While the database switch operation is in progress and the primary database is being copied to the secondary database 68, the secondary database 68 does not provide a back up for the primary database 66. If the With the NPF primary options menu 150, the user enters information at any field indicated by an arrow in the panel. Particularly, the user enters an NPF command comprising a letter or series of letters obtained from the menu, and a system I.D. number referring to the host computer which should execute any such command. A user i.d. number identifying the particular user, and the date and time are automatically displayed by the system. Normally, the user enters commands to be executed on the local host system. However, if a user enters a system I.D. for a selected remote host system, then when such command is passed to the command manager task 80, the command is transmitted to the selected remote system to be acted on, as discussed above relative to FIGS. 8 and 9.

From the NPF primary options menu, a user can enter a command comprising one of the letters listed in the left hand most column of panel #1. Specifically, by entering the letter "S" the NPF subsystem 34 displays a send processing menu at a block 170, see also FIG. 11b; if the letter "R" is entered, a received processing menu is displayed at a block 152, see FIG. 11c; if the letter "Y" is entered, then a system processing menu is displayed at a block 80, see FIG. 11d; if the letter "N" is entered, then a network processing menu is displayed at a block 90, see also FIG. 11e; if the letter "D" is entered, then a database processing menu is displayed at a block 200, see also FIG. 11f; and if the letter "T" is entered, then an NPF tutorial module is activated at a block 210.

Figure 11A:
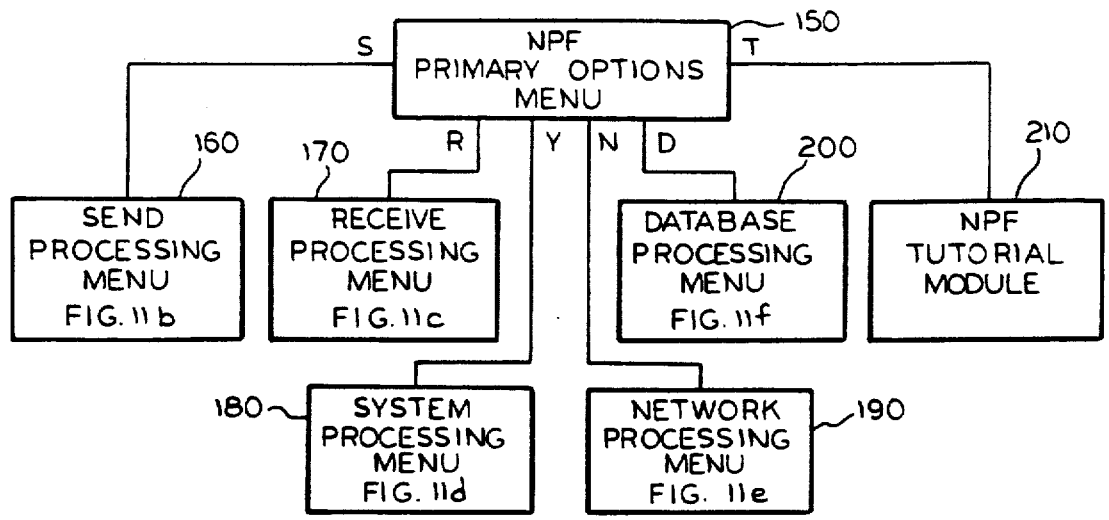
FIGS. 11a–11f are block diagrams which represent a menu hierarchy for the user interface of the host computer system of FIG. 4.
Figure 11B:
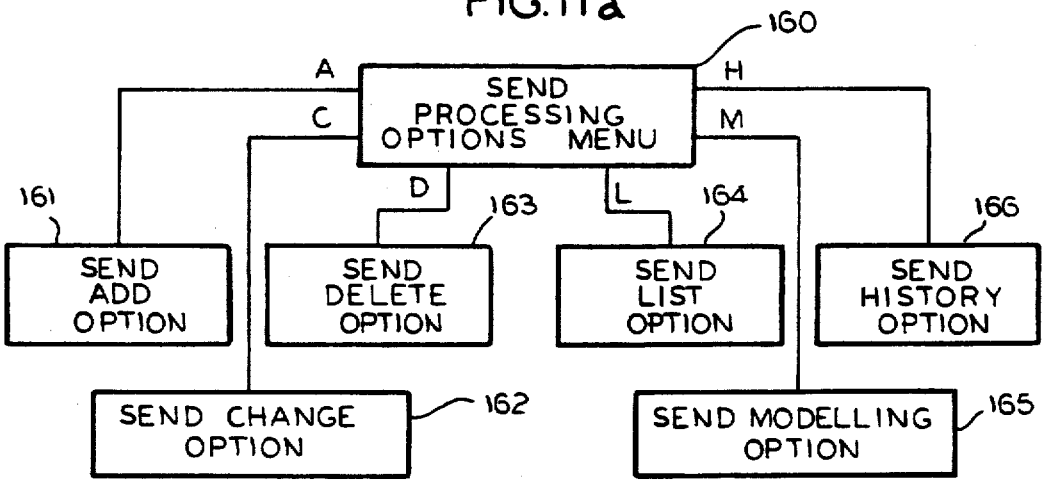

Referring to FIG. 11b, the send processing options menu 160 is divided into six sub-options represented by blocks 161-166. Specifically, the letter "A" represents the send add option at block 161; the letter "C" the send change option at block 162; the letter "D" the send delete option at block 163; the letter "L" the send list option at block 164; the letter "M" the send modeling option at block 165; and the letter "H" the send history option at the block 166. These options encompass all user operations that deal with the sending of data sets.

The send add option at block 161 is used to enter a request to the NDM subsystem 53 to send a dataset from one location to another. Each send request is unique and must specify a valid destination. When the send add option is requested a menu in the form of the following panel #2, entitled "Send Add Option Panel A", is provided for the user.

---

PANEL #2
SEND ADD OPTION PANEL A

NPFSAP ———     NETWORK DATA MANAGER/SYSID=nnnnnnn
COMMAND ——>
ADD SEND REQUEST:

To enter a SEND request, you must enter both the FROM
    DATASET, and the DESTINATION (remote NDM ID)

FROM DATASET ——>
(required)

DESTINATION ——>
(required)
    SEND parameters may be optionally copied from a send
    model or an existing send request by entering ONE of
    the following:

MODEL NAME ——>
(optional)

REQUEST ID ——>
(optional)

---

From this menu, the user must specify a FROM DATASET name and a destination. The FROM DATASET name is a fully qualified name of the dataset it is wished to transmit from a source host to a target host. The source host is determined by the system I.D. entered in the Primary Options menu at block 150 the target host is determined by the destination. Optionally, the user may enter a model name and a request I.D. The model name is used if the information for sending the dataset is stored in the NEST subsystem 58 under a predefined model name, as discussed below. Alternatively, a request I.D. may be entered if it is desired to copy parameters from an existing send request. Subsequently, a menu in the form of panel #3 below, entitled "Send Add Option Panel B" is displayed. This is used to select parameters used to send the dataset. Although the panel does not include parameters entered in the fields i.e., after the arrows, the actual display includes preselected default parameters. Such default parameters are determined from the model or the request I.D. specified on panel #2, or from predefined system default parameters.

---

PANEL #3
SEND ADD OPTION PANEL B

NPFSA ———     NETWORK DATA MANAGER/SYSID=nnnnnnn
COMMAND ——>

ADD SEND REQUEST:

-continued

PANEL #3
SEND ADD OPTION PANEL B

FROM DATASET ⟶  
DESTINATION ⟶  
MODEL ⟶

COMMENT ⟶

ACCOUNT NUMBER ⟶  
RECEIVE REFERENCE ⟶

PROCESS OPTIONS:                           SCHEDULING OPTIONS:

HOLD ⟶ (y/n)                SEND DATE ⟶  
(MM/DD/YY)  
   PRIORITY ⟶ (1-9; 1=high)    SEND TIME ⟶  
(HH:MM)

USER DATA ⟶   NOTIFY USER ID ⟶   SCRATCH ⟶  
(y/n)  
   SUB JCL ⟶  
   OPERATOR MSG ⟶

The receive reference field of panel #3 is used to notify the receiving host system where to find the receive parameters for the send request. The parameters can either be part of this send request, or they can reside in a receive request or a receive model at the receiving host system.

In order to use the receive parameters from a receive request or a receive model, the user types in a receive reference name corresponding to the receive request or model name, fills in the remainder of the send parameters and then presses the enter key. If the actual name is not known, then the receive reference field can be left blank. Thereafter, the NPF subsystem 54 generates an NDM command to send a dataset which command is transferred to the command manager 80, and the system returns to the add send primary screen at block 161 and displays a request I.D. for the request just scheduled, and the send add operation is completed.

To make the receive parameters part of the send request, the user types in an asterisk (*) in this field, fills in the remainder of the menu and then depresses the enter key. If an asterisk is entered for the receive reference field of panel #3, then a menu in the form of panel #4, entitled "Send Add Option Panel C" is displayed allowing the user to enter the receive parameters. Once the receive parameters are entered, pressing the enter key results in the request being scheduled, as above, and a request I.D. is displayed along with the add send primary screen at the block 161.

PANEL #4
SEND ADD OPTION PANEL C

NPFSA2                        NETWORK DATA MANAGER/SYSID=nnnnn

COMMAND ⟶  
ADD SEND REQUEST - RECEIVE INFORMATION

RECEIVE REFERENCE ⟶ *  
FROM DATASET NAME ⟶

DESTINATION ⟶  
   MODEL ⟶

COMMENT ⟶  
   ACCOUNT NUMBER ⟶

PROCESS OPTIONS:

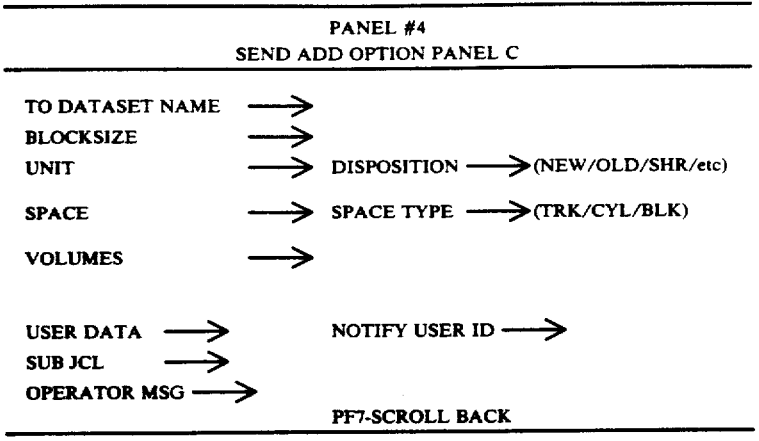

```
                        -continued
                        PANEL #4
                   SEND ADD OPTION PANEL C TO DATASET NAME   ⟶
BLOCKSIZE         ⟶
UNIT              ⟶   DISPOSITION ⟶ (NEW/OLD/SHR/etc)

SPACE             ⟶   SPACE TYPE ⟶ (TRK/CYL/BLK)

VOLUMES           ⟶

USER DATA  ⟶          NOTIFY USER ID ⟶
SUB JCL    ⟶
OPERATOR MSG ⟶
                        PF7-SCROLL BACK
```

The send change option at block 162 is used to change or display previously entered send request which has not yet been completed, i.e., is in the active or pending queue. If the request is still pending, practically any parameter can be changed. However, if the send request is currently active, very few parameters can be changed. Specifically, receive parameters cannot be changed in an active or interrupted request since the request has began execution.

The send delete option at block 163 is used to delete a send request from the pending or active queue. For active and interrupted requests, this results in aborting the transmission and for pending requests results in removal of the request from the pending queue.

The send list option at the block 164 is used to list send requests that are on the active or pending queue. The user can indicate which requests are to be listed by requesting all active requests for a specific destination or by entering search parameters when prompted by the send list menu screen. From the send list option, the user may enter a selection from the table below, to perform the indicated action.

TABLE

| Code | Action |
|------|--------|
| S | Select the request I.D., used to display or make changes to the parameters of a specific request. |
| D | Delete the request I.D., used to delete a request from the system. |
| I | Interrupt the request I.D., used to stop an active request and change its status to interrupted. |
| H | Hold the request I.D., used to prevent the system from processing the request, active request put on hold become interrupted after a predetermined length of time. |
| R | Release the request I.D., used to change a request that has been held, therefore making it available for processing by the system. |

The send modeling option at the block 165 is used to add, change, display, delete or list model entries from the NEST subsystem 56. Accordingly, the user can build send models in applications where related datasets will be transmitted frequently. For example, in the above discussed example for an order entry system, the system may need to transmit order datasets on a daily basis. Accordingly, a send model might be stored which includes information for sending such order datasets. These models are particularly useful in batch applications where a send request is generated by an application job stream, and the application job stream refers to the particular model to initiate the send request.

The send history option at the block 166 is used to display information about send requests that have completed successfully or were cancelled prior to completion. The user is prompted with search parameters which are designed to narrow the scope of the history entry search.

Figure 11C:
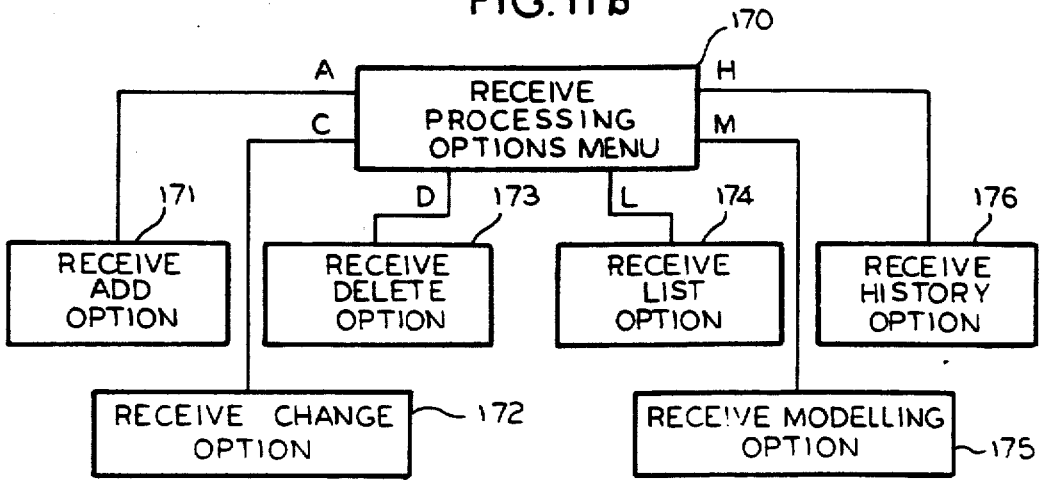

If from the primary options menu at the block 150, the user enters the letter "R", the receive processing options menu is displayed at block 170, see FIG. 11c. The receive processing options are divided into six suboptions represented by the respective blocks 171-176. Specifically, by entering the letter "A", control advances to receive add option at the block 171; by entering the letter "C", the receive change option at the block 172; by entering the letter "D", the receive delete option at the block 173; by entering the letter "L" the receive list option at the block 174; by entering the letter "M", the receive modeling option at the block 175; and by entering the letter "H", the receive history option of the block 176. These options encompass all user operations that deal with the receiving of datasets.

The receive add option at the block 171 is used to enter a receive request into the NDM subsystem 36 to receive a dataset transmitted from another host computer. When this option is selected, a menu in the form of panel #5 below entitled "Receive Add Panel A" is displayed. Each receive request is unique, and must specify a valid origin, that is, the origin must have been previously defined in the remote NDM definition, discussed above. The receive reference entered on the screen is used by the NDM subsystem 53 to locate the correct receive parameters to be matched to a specific send request. It must match the receive reference name that was entered on the send request or, if no receive reference was specified on the send request, it must match the FROM DATASET name. Optionally, the user may specify the name of a receive model, or a request i.d. of a previous receive request, from which the remaining receive parameters should be taken. Although both the model and request i.d. are optional fields, only one of them may be specified at a time. If specified, the model must have been previously added to the NEST subsystem 56, and the request i.d. must be of valid non-history receive request.

| PANEL #5 |
| --- |
| RECEIVE ADD PANEL A |

```
NPFRAP ———            NETWORK DATA MANAGER/SYSID=nnnnnn
COMMAND ——>
ADD RECEIVE REQUEST:

To enter a RECEIVE request, you must enter both the
   RECEIVE REFERENCE, and the ORIGIN (remote NDM ID)

RECEIVE REFERENCE ——>
(required)

ORIGIN      ——>
(required)

RECEIVE parameters may be optionally copied from a receive model or an
   existing receive request by entering ONE of the following:

EXISTING MODEL NAME ——>
(optional)

EXISTING REQUEST ID ——>
(optional)
```

The receive parameters are used to determine what action is taken upon receiving a dataset. For example, a TO DATASET must be defined, indicating where the dataset is to be stored.

with the same receive reference name and origin, or a blank origin, or a model with the name of "default" and the origin, or a blank origin;

4. If no parameters are found, then the screen is filled

| PANEL #6 |
| --- |
| RECEIVE ADD PANEL B |

```
NPFRA ———             NETWORK DATA MANAGER/SYSID=nnnnn
COMMAND ——>
ADD RECEIVE REQUEST:

RECEIVE REFERENCE ——>
    ORIGIN        ——>
    MODEL         ——>

COMMENT ——>
ACCOUNT NUMBER ——>

PROCESS OPTIONS:

HOLD            ——> (y/n)
    TO DATASET NAME ——>
    BLOCKSIZE       ——>
    UNIT            ——>  DISPOSITION ——>(NEW/OLD/SHR/etc)
    SPACE           ——>  SPACE TYPE  ——>(TRK/CYL/BLK)
    VOLUMES         ——>

USER DATA  ——>   NOTIFY USER ID ——>
    SUB JCL    ——>
    OPERATOR MSG ——>
```

From the panel A menu, a menu in the form of panel #6 entitled "Receive Add Panel" is displayed allowing the user to enter the receive parameters information. The fields contain default variables obtained from one of the following places in hierarchical order:

1. An existing receive request, if one was specified in the panel A menu;
2. An existing model whose name is specified on the panel A menu;
3. If no request i.d. or model is specified, then the system searches, in hierarchical order, for a model with parameters displayed the last time the screen was displayed; or
5. The first time the screen is invoked, system defaults are displayed.

The user may use the displayed values or overkey any modifiable field. To enter the receive request, the user presses the enter key. If the receive request is accepted by the NDM subsystem 53, then the user receives it back with a message indicating the unique request of i.d. assigned by the SNDM subsystem 53.

The receive change option at block 172 is used to change or display previously entered receive requests. This operation is similar to the send change option block 162 discussed above. The receive delete option at the block 173 is used to delete receive requests from the pending or active queue and is similar to the send or delete option at the block 163. The receive list option at the block 174 is used to list receive request on the active or pending queue and is similar in operation to the send add list option of the block 164. The receive modeling option at the block 175 is used to add, change, display or list model entries from the NEST subsystem 56. This permits the user to define selected receive models to expedite the handling of receiving datasets. The receive history model of the block 176 is used to display information about receive requests that have been completed successfully or are cancelled prior to completion.

As indicated above relative to the example CHART, a send request must be matched to a receive request, at the receive site, prior to any data transmission. It is necessary that before the dataset be received, the receiving system must be configured to receive and use the dataset in whatever format it resides. Resultantly, the receive parameters are used to provide a corresponding file in the receiving site for receiving a dataset from the sending site. The matching process determines which of the receive parameters are to be used to unload the transmitted dataset. A match code indicates where the actual receive parameters which are used were found.

The following table illustrates the match codes which are provided and outlines generally how the send requests are matched with receive requests:

MATCH CODE TABLE

If the Receive Reference field on the Send request is blank, then the Send request matches the Receive request as follows:

A1: Using the From Dataset name and Origin (Of Send request) to match with an existing request on the receive pending queue.

A2: Using a Receive model whose name is equal to the From Dataset name and Origin in the Send Request.

A3: Using a Receive model whose name is equal to the From Dataset name in the Send Request and a blank Origin.

A4: Using the Receive model whose name is equal to "Default" and the Origin in the Send Request.

A5: Using the Receive model whose name is equal to "Default" with a blank origin.

If the Receive Reference field on the Send request is "*", then the Send request matches the Receive requests as follows:

B1: Using the From Dataset name and Origin (of Send request) to match with an existing request on the receive pending queue.

B2: Using a Receive model whose name is equal to the From Dataset name and Origin in the Send Request.

B3: Using a Receive model whose name is equal to the From Dataset name in the Send Request and a blank Origin.

B4: Using the Receive model whose name is equal to "Default" and the Origin in the Send Request.

B5: Using the Receive model whose name is equal to "Default" with a blank origin.

B6: Using the Receive parameters found in the Send request.

If the Receive Reference field on the Send request is not blank and not "*", then the Send request matches the Receive request as follows:

C1: Using the Receive Reference and Origin (of Send Request) to match with an existing request on the receive pending queue.

C2: Using a Receive model whose name is equal to the Sending Receive Reference and Origin.

C3: Using a Receive model whose name is equal to the Sending Receive Reference and a blank Origin.

Specifically, a send request is matched with a receive request using the receive reference name. If the receive reference of the send request includes a specific name, then the receiving system first attempts to match the receive reference and origin to those of an existing request on the receive pending queue. If one is found, then the receive parameters of the pending receive request are utilized. Otherwise, the receiving system searches for a receive model having a name identical to the sending receive reference and origin. If no such file is found, then the receiving system searches for a receive model whose name is the same as the sending receive reference and having a blank origin. If no such model exists, then no match is made and the send request is rejected.

If the send parameter receive reference is an "*", then the receive parameters are sent as part of the send request, as discussed above. However, the receiving system first attempts to find a pending request or model identical to the specified receive parameters. Particularly, the receiving system uses the FROM DATASET name and origin of the send request to match those of an existing request on the receive pending queue. If none is found, then the system searches for a receive model having a name equal to the FROM DATASET name and origin, or alternatively, a blank origin. If no match is found on this basis, then the receiving system searches for a receive model whose name is equal to "default" and the same origin as the send request, or alternatively a blank origin. Lastly, if the receiving system is configured to do so, the receiving system uses the actual receive parameters found in the send request. If not, then the send request is rejected.

The last alternative is that the send request include blank field in the receive reference, i.e., no information was entered. If so, then the receiving system uses the FROM DATASET name and origin of the send request to match those of an existing request on the receive pending queue. If none if found, then the system searches for the receive model having a name equal to the FROM DATASET name and origin, or alternatively, a blank origin. If no match is found in this way, then the receiving system searches for a receive model whose name is equal to "default", and the origin of the send request, or alternatively, blank origin. Otherwise, the request is rejected.

Figure 11D:
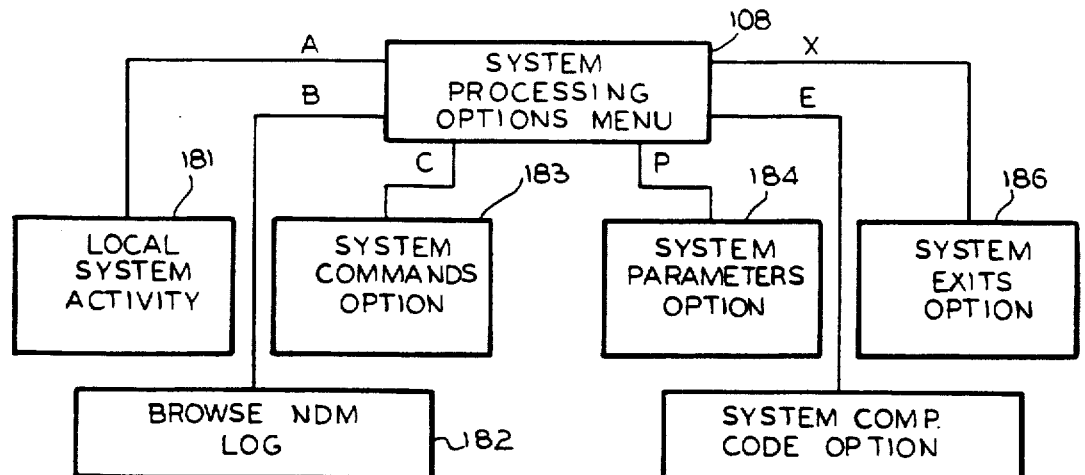

If from the NPF primary options menu, see FIG. 11a, the user depresses the "Y" key, then the system processing menu 180 is displayed. Referring to FIG. 11d, the system processing options menu 180 is divided into six sub-options represented by blocks 181-186. Specifically, the letter "A" represents the local system activity block 181; the letter "B" represents the browse NDM log block 182; the letter "C" represents the systems commands options block 183; the letter "P" represents the system parameters option block 184; the letter "E"

represents the system completion codes option block 185; and the letter "X" represents the system exits option block 186.

The local system activity block 181 is used to display the current local system send and receive activity. If this option is selected, then a table is built, with each entry in the table representing an active send or receive task currently executing in the local system. Along with this list are totals for all send and receive tasks, broken down by their status. From this screen, a user can enter a selection code, as discussed above relative to the TABLE.

The browse NDM log at block 182 is used to list all of the system activity beginning with a selected date and time. If the user selects this option, the user is prompted for a starting date and time. Optionally, the user can search for a specific string of characters. The amount of system log information which is available to browse depends on the file retention size of the NEST subsystem 56.

The system commands option at block 183 is used to execute NDM subsystem commands that control operation of the NEST subsystem 56.

The system parameters option at block 184 is used to display and/or change the current parameter values for the local NDM subsystem 53. If this option is chosen, a screen display is provided which displays the parameters currently in affect for the local NDM system 53. These parameters include, for example, the tape or disk units 40 and 42 used for default allocations.

The system completion codes option at the block 185 is used to add, change, display or delete NDM completion code descriptions. The system exits option at block 186 is used to add or remove installation security exits to the local NDM subsystem 53. The installation exits comprise locations with specific routines executed at critical points in the system to provide for extended control. Specifically, these exits provide security for limiting access to certain aspects of the system, according to a user's or operator's specific requirements.

Figure 11E:
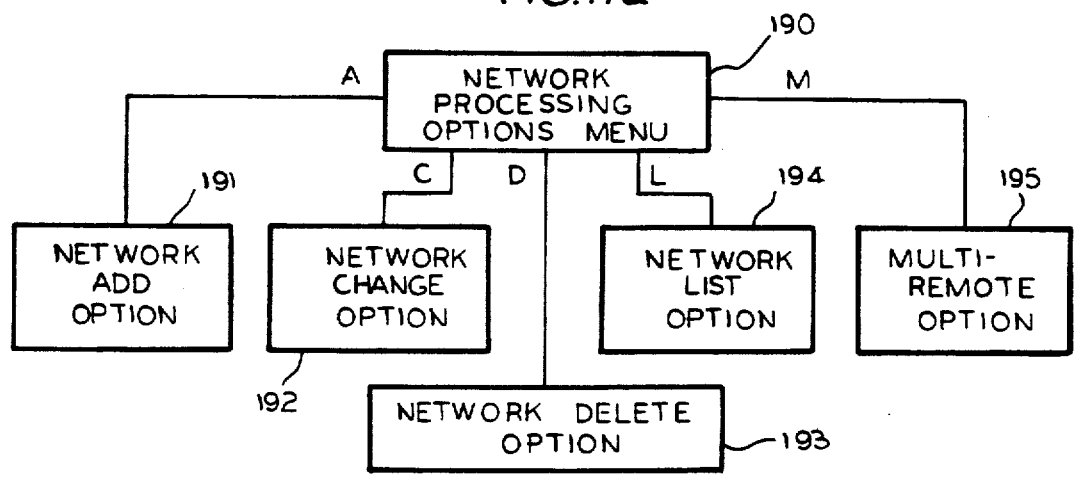

If from the primary options menu at block 150, FIG. 11a, the user selects the "N" key, then the network processing menu display 190 is provided. Referring to FIG. 11e, the network processing options menu 190 is divided into five sub-options represented by blocks 191-195. Specifically, the letter "A" represents the network add option at block 191; the letter "C" represents the network change option at block 192; the letter "D" represents the network delete option at block 193; the letter "L" represents the network list option at block 194; and the letter "M" represents the multi-remote option at block 195. The network processing functions deal with the definition and status of remote NDM definition elements.

The network add option block 191 is used to define new remote NDM definitions to the local NDM system. The user is provided with a remote NDM detail screen in which the user can enter information on the remote system. Particularly, a system i.d. must be entered as the name by which the local NDM subsystem 53 will identify the remote system. Also, the remote system must be indicated as being available or not available. Particularly, this is used to indicate whether or not a selected remote NDM subsystem, e.g., 53-B, is available to communicate with the local system. If not, then neither datasets nor commands can be sent or received from the particular remote system. This can be used as a security measure. Also, this option is used to indicate whether or not the local NDM subsystem will or will not accept incoming receive parameters from the particular remote. These are the receive parameters discussed above which are specified on the send requests added to the remote systems work queue.

The network change option at block 192 is used to change information on a previously entered remote NDM definition. The network delete option at the block 193 is used to delete previously defined remote NDM definitions. The network list option at the block 194 is used to list the remote NDM definitions which are currently defined to the local NDM subsystem. If this item is chosen, then an entry for each NDM i.d. is built and displayed in tabular format. While scrolling through the list, the user can perform operations on a specific definition as by entering selection codes for selecting or deleting the particular definition.

The multi-remote option at the block 195 is used to add, change, display, delete or list the multi-remote NDM definitions. A multi-remote NDM definitions is a list of previously defined remote NDM definitions. If a multi-remote NDM definition is used at a destination when adding a send request, the NDM system automatically generates multiple send requests, one for each remote listed in the multi-remote NDM definition. Once the requests are added, they are treated identically to those added without using remote NDM definition as a destination.

Figure 11F:
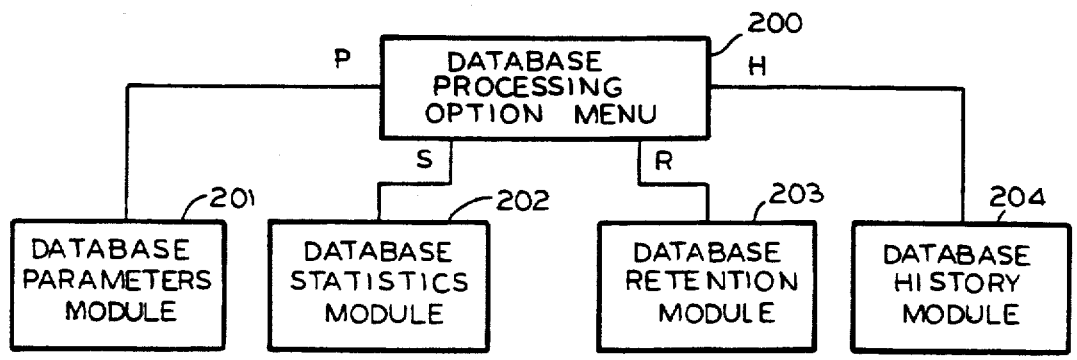

If from the primary options menu 150, see FIG. 11a, the user enters the letter "D", the database processing menu at block 200 is displayed. Referring to FIG. 11f, the database processing options menu 200 is divided into four sub-options represented by blocks 201-204. Specifically, the letter "P" represents the database parameters module block 201; the letter "S" represents the database statistics module block 202; the letter "R" represents the database retention module block 203; and the letter "H" represents the database history module block 204. The database processing options deal with the NEST subsystem 56.

The database parameters module at block 201 is used to display and modify any of the NEST subsystem parameters, including, for example, system waits times and database switching data. Specifically, relative to database switch data, this module is used to preselect the time span between when database switching operations take place. If this time interval elapses following a database switch, another database switch is initiated, each time a switch occurs, by any means, this timer is reset.

The database statistics module at the block 202 is used to display statistical information about the NEST subsystem which indicates the current primary database, and information such as the number of records added, deleted, retrieved or updated in the database, as well as database VSAM statistical information.

The database retention module at block 203 is used to list the various database record types and the preselected retention period for each record type. Specifically, this information is used in the culling process discussed above to delete the records which have been retained in the system longer than necessary.

The database history module at block 204 is used to display information about a database switch which has occurred. The most recent switch information is displayed.

For simplicity of operation, when a user is accessing the NPF primary options menu, see FIG. 11a and panel

1, the user can quickly proceed directly to a particular suboption without the intermediate step of calling up the associated suboption menu, such as the send processing options menu 160. Particularly, it is desired to proceed to the send add option, the user can in the command line of panel #1, enter the letter "S" followed by a period, and then the letter "A" and depress the enter key to proceed immediately to the send add option at block 161. The operator can act similarly to proceed directly to any of the suboptions shown in FIGS. 11B through 11F, which are discussed in detail above. Also, as discussed above, utilizing the ISPF system under the TSO interface, invoking any of the NPF suboptions results in a command being generated responsive to the specific action taken by the user. For example, when the send add option is invoked, a dataset send command is processed which is transferred through the cross memory interface 78 to the command manager 80, see FIG. 5.

As discussed above, it is possible to enter a command to be executed by a remote host. For example, a user at Host A can cause a dataset to be transmitted from Host B to Host A assuming the user is authorized to do so and the remote NDM definition permits remote commands to be received. To implement such an operation, the user enters the system I.D. for the Host B in the SYSID field while in the NPF primary options menu at block 150. Thereafter, the user invokes the send add option, as discussed above, indicating the dataset to be transmitted under the FROM DATASET field, and indicating the i.d. for the local Host A system under the destination field. When all of the menus have been built, as above, the NPF subsystem 54 generates a send command which is transferred through the cross memory task 78A-A to the command manager 80-A of the local Host A NDM subsystem 53-A. However, the RCCB for the command includes an indication that it is a remote command resulting in the send request being transferred, as discussed above relative to FIGS. 7-9 to the Host B NDM subsystem 36-B. At the Host B, the NDM subsystem 53-B acts on the send command as though it were entered locally, and assuming all other requirements have been fulfilled, a send task 90-B is created by the queue manager task 82-B so that eventually the desired dataset is transmitted over the integrated data network 34 to the local Host A, where it is stored as a dataset on the DASD 42-A or the tape 40-A.

In the above example, it was not necessary for the user to log on to either Host A or B NDM subsystem 53-A or 53-B. Instead, the actual send command was generated in a separate address space under the NPF subsystem 54-A which subsequently utilized the cross memory services to pass the command to the local NDM subsystem 53-A without requiring the user to log on. Subsequently, a cross system communication was established between the local and remote NDM subsystem 53-A and 53-B, respectively, without the necessity for either the user or the local NDM subsystem 53-A to log on to the remote NDM subsystem 53-B. In fact, the transferring of the command is done transparent to the user, resulting in the user entering commands as though the user console 46-A were directly tied to the Host B system 30-B.

BATCH INTERFACE

The batch interface 48, see FIG. 4, provides access to the NDM subsystem 36 to application job streams 59 through standard job control language or JCL. This allows the application job stream 59 to submit the dataset transfer request as part of a normal execution. The job streams need a JCL step to execute a batch NDM program placing send requests to a VSAM file. Responsive thereto, the NDM subsystem 53 reads and validates the requests in a VSAM file. Also, the NDM batch notify program 76 can optionally wait for a response to record the acceptance or rejection of the request in a system report.

Figure 12:
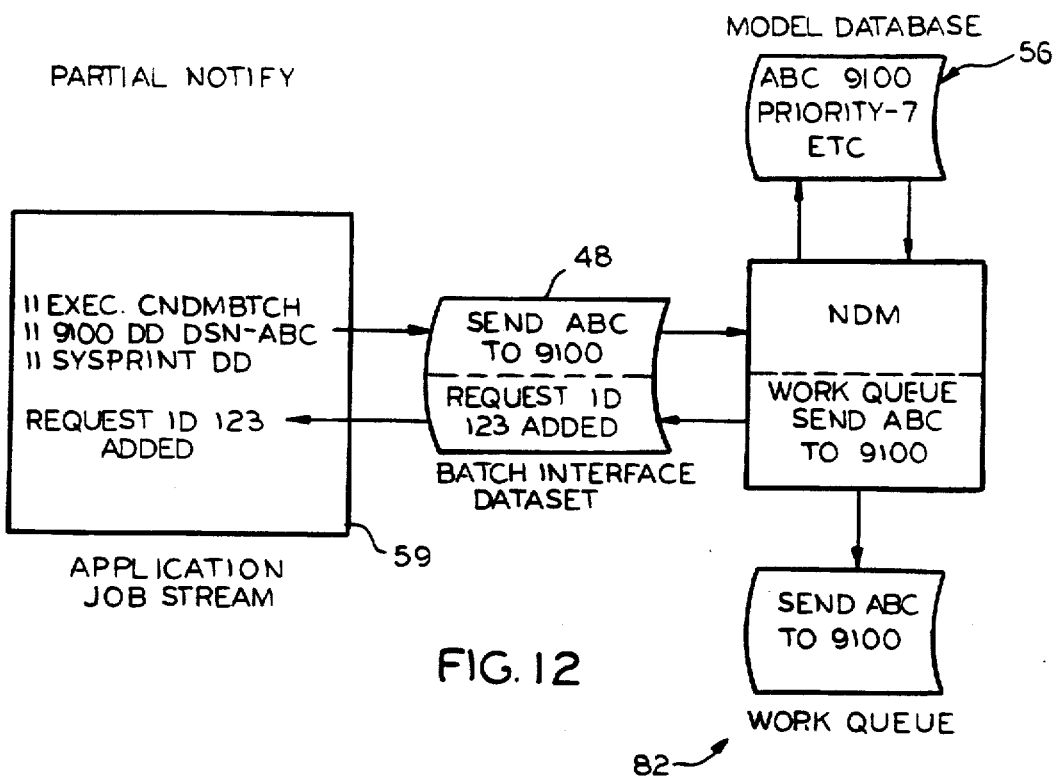
FIG. 12 is a combined block diagram and flow diagram which illustrates the operation of a batch interface notification procedure for a partial notify.

There are two types of batch notification procedures which are supported, namely partial notify and complete notify. Referring to FIG. 12, a simplified flow diagram illustrates the operation of the partial notify procedure. A partial notify is used when the user provides only the dataset name and destination via JCL parameters.

Each dataset transferred is named in the DSN equal key word parameter with its own DD statement in the job step. The DD name on each statement is the NDM i.d. of the destination.

In the illustrated example, the first command EXEC CNDMBTCH, invokes the batch interface program 59. The second command 9100 DD DSN-ABC, is a command to the batch interface program 59 that a dataset having the name "ABC" should be sent to destination "9100". The batch interface program compiles this instruction into a command to transfer the same to the NDM subsystem 53, specifically the batch task 76, see FIG. 5. The command task retrieves a send model with the same name as the dataset and uses the remaining parameters defined in the model to build the send request, as discussed above. Since the command is a send command, the command manager 80 passes the request to the queue manager 82 as discussed above, which attaches a send task 90. The batch notification program 59 waits a brief time, then reads the VSAM file for the request I.D. When it is found, a message containing the request I.D. is written out to the batch interface SYSPRINT file. This communication causes the batch user to know that a send request was actually added to the system and causes the batch user to know the actual request I.D. which can then be used as a request follow up.

Figure 13:
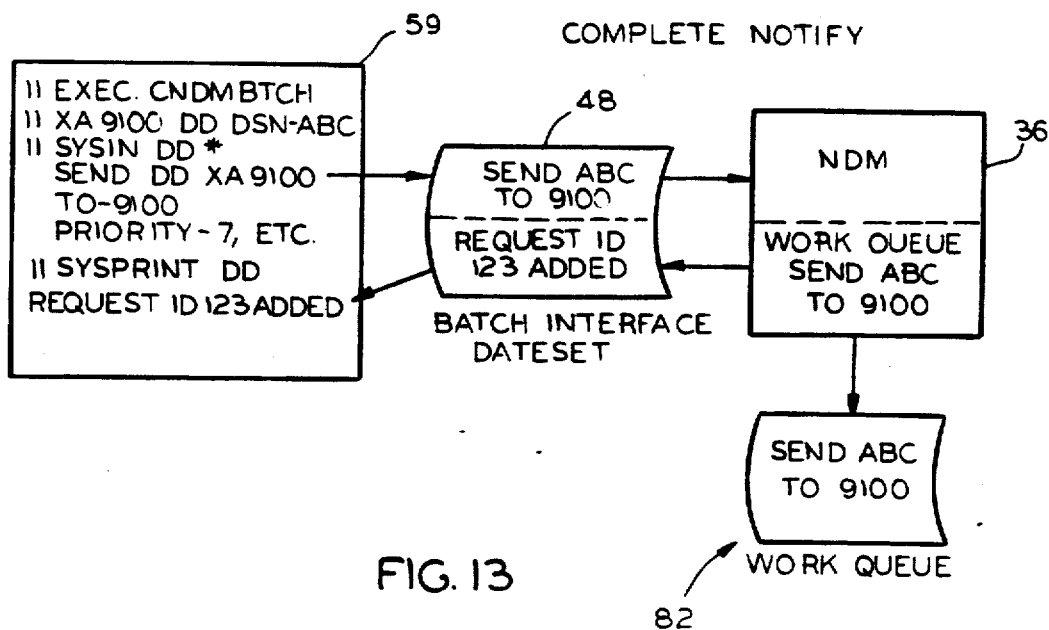
FIG. 13 is a combined block diagram and flow diagram which illustrates the operation of a batch interface notification procedure for a complete notify.

Referring to FIG. 13, a generalized flow diagram illustrates the operation of a complete notify procedure. The complete notify eliminates the requirement for accessing a model, although it is still valid. Instead, all send parameters are supplied to the NDM subsystem 36 via a SYSIN DD statement added to the job step. Subsequently, the send request is processed using the selected send parameters, rather than preselected send parameters obtained from a model, as with a partial notify.

SECURITY

The communications network data manager system is provided with multiple levels of security. For example, the panels built under the ISPF interface can be designed to permit users to implement only preselected functions. Commands are usually restricted via the "command validation exit" which checks the user's password. Also, various password levels can be provided so that the user is provided access only to certain of the panels under the NPF options. For example, the casual user may not be provided with access to the systems processing options menu at block 180, the network processing options menu at block 190 or the database processing options menu at block 200.

The remote authorization described above relative to the remote NDM definition, can be used to limit host remote systems which a user has access to. Similarly, the send and receive dataset security exits discussed above relative to block 186, see FIG. 11d, can be configured to provide selective access. Particularly, if a user does not have access to certain datasets then the user cannot issue a send request for such a dataset. This may be used, for example, to limit the access for reviewing and transmitting confidential data such as, for example, payroll data.

We claim:

1. In a communication network data system including a plurality of central processing unit (CPU) systems, each said CPU system including means for generating processing commands executable on any one of said CPU systems and including means for selecting one of said CPU systems for executing a generated processing command, and command processing means responsive thereto for implementing said commands, and a data communication network interconnecting each of said CPU systems, a command management system associated with each of said CPU command processing means comprising:

means operatively associated with said command generating means for receiving commands therefrom;

means for determining a CPU system for which each said command is selected to be implemented by; and means operatively associated with said determining means for transmitting each said command to said CPU system's command processing means, or alternatively, to another of said CPU system's command processing means, according to the selected CPU system which is to implement the command as determined by said determining means.

2. The command management system of claim 1 wherein said communication network data system further nicludes a user console associated with each CPU system, and wherein said receiving means comprises itnerface means for receiving commands generated from said user console so that the user console associated with each of the central processing unit systems can enter commands which are processed in any central processing unit system within the communication network data system.

3. The command management system of claim 2 wherein said determining means comprises means for requesting a user at the console to enter indicia representing the CPU system which said command is to be implemented by.

4. The command management system of claim 2 wherein said data communication network comprises an integrated data network provided dedicated interconnection between said central processing unit systems, and wherein said transmitting means includes means for communicating with said other of said CPU systems without any requirement for the user to directly gain access to such other CPU systems.

5. A data transfer system comprising:

a plurality of central processing unit (CPU) systems, each said CPU system including a processor operable under the control of a sequence of programmed instructions, memory means for storing data representing said programmed instructions and datasets to be transferred, computer interface means for transmitting datasets, data send processing means for reading datasets from said memory means and transferring such data directly to said interface means, and receive processing means for transferring datasets received at said interface means directly to said memory means;

a data communication network interconnecting each of said CPU system interface means for providing a communication path for transferring datasets therebetween; and means operatively associated with each of said CPU systems for implementing the operation of said data send processing means in order to transfer a dataset stored on one of said CPU systems memory means to the memory means of another of said CPU systems.

6. The data transfer system of claim 5 wherein said implementing means comprises a user console and interface means coupling said user console to said send processing means for generating commands to transfer dataset respsonsive to user instructions.

7. The data transfer system of claim 5 wherein said implementing means comprises a series of said programmed instructions periodically generating a command to said send processing means to transfer a dataset to another of said CPU systems.

8. In a communication network data manager system including a plurality of host computer systems each interconnected by a communication network which is operable to transfer data stored at any one of said host computers to be stored at another of said host computers, each said host computer system including a data transfer system comprising:

a memory storage device for storing datasets of information; network interface means connectable with said communication network and operable to transmit to, or receive data from, another of said host computer systems over said communication network;

processing means coupled to said memory storage device and said network interface means for processing data responsive to a processing program stored in said memory storage device, said processing means including means for reading data from said memory means and transferring said read data directly to said network interface means to be transmitted to another host computer system and means receiving data from said network interface means for writing said received data directly to said storage means, and means for establishing communication with another of said host computers, said establishing means including means for respectively operating said reading means or said writing means to read a selected dataset from said storage device to be transmitted over said network or to write a received dataset to said data storage device.

9. The data transfer system of claim 8 wherein said establishing means comprises a user console and interface means for coupling said user console to said processing means for generating commands to send a dataset responsive to user instructions.

10. The data transfer system of claim 5 wherein said establishing means comprises said processing program periodically generating a command to said establishing means to transfer a dataset to another of said CPU systems.

11. A method of transmitting data between a local host computer system and a remote host computer system, each said computer system including a programmed central processing unit (CPU), a data storage device, and a network interface, said local and remote host computer network interfaces being interconnected by a data communication network, comprising the steps of:

establishing a communication path between the respective network interfaces of said local host computer and said remote host computer;

operating said local host computer CPU to read a dataset directly from said data storage device;

operating said local host computer CPU to transfer the read dataset to said network interface to be transmitte thereby over said communication network to said remote computer's network interface; and operating said remote computer CPU to write said transmitted dataset from said network interface directly to said data storage device.

12. The method of claim 11 wherein said local host computer system further comprises means for generating a command to said CPU for transferring a dataset to the remote host computer system, and further comprising the step of initiating a data transmission by sending a command from said generating means to said local host computer CPU.

13. The method of claim 11 wherein said CPU includes means for storing a plurality of dataset send command, each send command being used to initiate the sending of datasets to the remote host computer system, and further comprising the step of sequentially operating said establishing step and said first, second and third operating steps to transmit the plurality of datasets as specified by said storing means.

14. The method of claim 11 wherein said establishing step includes the step of generating a send request to be transmitted from said local host computer system to said remote host computer system, and matching said send request to a receive request stored in said remote host computer system data storage device.

15. In a host computer system including a programmed processing unit for executing a series of programmed instructions and data storage means for storing processing data, a maintenance system comprising:

a first database means associated with said data storage means for storing processing data, which data may be read to or written from said processing unit;

a second database means associated with said data storage means for storing processing data, which data may be read to or written from said processing unit;

coupling means for alternately coupling either said first database means or said second database means to said processing unit; and switching means operatively associated with said first and second database means and said coupling means for commanding said coupling means to alternate the database means coupled to said processing unit, said switching means including means for copying the data from the one database means coupled to said processing unit to the other of said database means prior to commanding said coupling means to alternate between said database means.

16. The data maintenance system of claim 15 further including third database means for storing only data which is written to the one of said database means coupled to the processing unit subsequent to the alternating of said database means by said coupling means.

17. The data maintenance system of claim 16 further comprising back up means for combining data from said third database means with the data from the first or second database means not coupled to said processing unit in the event that the data from the one database means coupled to the processing unit is inaccessible.

18. The system of claim 15 wherein said processing data is stored on storage means only for a preselected period of time, and wherein said copying means includes selective means for copying only data which has been stored for a period of time less than the preselected period of time.

19. A communication network data manager system comprising:

a plurality of host computer systems, each said host computer system including a central processing unit (CPU) operating according to a series of programmed instructions, a memory means for storing data, said data representing said programmed instructions, and other processing information, said memory means defining a plurality of address spaces, each space storing data representing a plurality of different application programs and datasets related thereto;

a communication interface means operatively associated with said CPU for establishing a data communication path between said CPU and the CPU associated with another of said host computer systems;

user interface means comprising a user console and a memory means for storing console program information data and other user data, and defining an address space distinct from said processing unit address space, so that said user console operates independently of said processing unit;

coupling means operatively associated with said user interface means and CPU for transferring data between their respective memory address spaces; and control means operatively associated with said processing unit and responsive to a send request command from said user interface manual address space to said CPU's memory means address space for reading a selected dataset from said memory means and transmitting same to said communication interface means to be transmitted to another of said host computer systems;

a communication data network coupled to the communication interface means of each said host computer for enabling each of said host computers to transmit dataset information therebetween;

a plurality of data send transfer means, one for each of said host computer systems and each being operatively associated with said CPU and responsive to a command received from said user console thereof to read datasets from said memory means and transfer same to said communication interface means for transmission over said communication network; and a plurality of data receive transfer means, one for each of said host computer systems and operatively associated with said CPU and response to a communication path being established with the CPU of another of said host computer systems to receive datasets from said communications network and write same to said memory means.

* * * * *